US012494647B1

(12) United States Patent
Farag et al.

(10) Patent No.: US 12,494,647 B1
(45) Date of Patent: Dec. 9, 2025

(54) REDUCING THE REQUIRED CAPACITANCE OF AN ULTRACAPACITOR (UC) IN HYBRID ENERGY STORAGE SYSTEMS (HESS) UTILIZING OPTIMAL CONTROLLERS

(71) Applicant: University of Tabuk, Tabuk (SA)

(72) Inventors: Sherif Ahmed Zaid Farag, Tabuk (SA); Hani Awad Khalaf Albalawi, Tabuk (SA); Aadel Mohammed Alatwi, Tabuk (SA); Mohamed Ahmed Mostafa Hassan, Tabuk (SA)

(73) Assignee: University of Tabuk, Tabuk (SA)

( * ) Notice: Subject to any disclaimer, the term of this patent is extended or adjusted under 35 U.S.C. 154(b) by 0 days.

(21) Appl. No.: 19/278,904

(22) Filed: Jul. 24, 2025

(51) Int. Cl.
*H02J 3/28* (2006.01)
*H02J 7/00* (2006.01)
*H02J 7/34* (2006.01)

(52) U.S. Cl.
CPC ............ *H02J 3/28* (2013.01); *H02J 7/00712* (2020.01); *H02J 7/345* (2013.01); *H02J 2207/20* (2020.01)

(58) Field of Classification Search
CPC .......... H02J 3/28; H02J 7/00712; H02J 7/345; H02J 2207/20
See application file for complete search history.

(56) References Cited

U.S. PATENT DOCUMENTS 10,488,827 B2 * 11/2019 Ludwig .................. G05B 11/01
11,307,539 B1 * 4/2022 Al-Saggaf ............... G05B 6/02

FOREIGN PATENT DOCUMENTS

| CN | 112564252 A | * | 3/2021 | ............ G06F 30/20 |
|----|-------------|---|--------|------------------------|
| CN | 114709866 A |   | 7/2022 |                        |
| CN | 115498744 A |   | 12/2022 |                       |
| CN | 112564252 B |   | 11/2023 |                       |

OTHER PUBLICATIONS

Houssam Eddine Ghadbane, et al., "Optimal Adaptive Fractional Order Integral Sliding Mode Controller-Energy Management Strategy for Electric Vehicles Based on Bald Eagle Search Algorithm", International Journal of Energy Research, vol. 2024, Article ID 7844084, Feb. 20, 2024, 22 pages.

Sathesh Murugan, et al., "Hybrid DC-AC Microgrid Energy Management System Using an Artificial Gorilla Troops Optimizer Optimized Neural Network", Energies 2022, vol. 15, 8187, Nov. 2, 2022, 19 pages.

* cited by examiner

*Primary Examiner* — Charles Cai
(74) *Attorney, Agent, or Firm* — Oblon, McClelland, Maier & Neustadt, L.L.P.

(57) ABSTRACT

A control system and a method for controlling a direct current (DC) link voltage of a hybrid energy storage system (HESS) includes a fractional-order proportional integral (FOPI) controller receives a voltage difference between the DC link voltage and a predetermined reference voltage and generate a reference charging current based on the voltage difference, a hysteresis controller receives a current difference between the reference charging current and a charging current of the HESS and generate a control signal based on the current difference, and a logic circuit receives the control signal and manage charging and discharging procedures of the HESS based on the control signal, so that the DC link voltage of the HESS is constant at the predetermined reference voltage, where the FOPI controller has parameters based on a metaheuristic technique.

20 Claims, 13 Drawing Sheets

REDUCING THE REQUIRED CAPACITANCE OF AN ULTRACAPACITOR (UC) IN HYBRID ENERGY STORAGE SYSTEMS (HESS) UTILIZING OPTIMAL CONTROLLERS

BACKGROUND

Technical Field

The present disclosure is directed to hybrid energy storage systems and methods and, more particularly to, reducing the required capacitance of an ultracapacitor (UC) in hybrid energy storage systems (HESS) utilizing optimal controllers.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The last few decades have witnessed a sharp increase in global energy consumption driven by population growth and industrialization. Traditional electricity generation methods, primarily reliant on fossil fuels, are not only finite and increasingly inadequate but also contribute significantly to environmental degradation. As a result, the use of renewable energy sources such as solar, wind, and tidal energy has gained considerable traction due to their sustainability and ecological advantages.

However, a major limitation of renewable energy systems is the intermittent and variable nature of their power output. While this variability may be manageable in large, utility-connected grids, it presents serious operational challenges for small microgrids and isolated systems. To mitigate these issues, hybrid energy systems that combine multiple renewable sources, such as wind and solar, have been developed. These hybrid systems exploit the complementary generation profiles of different sources, thereby improving overall power availability and reliability.

Hybrid wind/photovoltaic (PV) systems have been widely studied and implemented. Control strategies for such systems have evolved from conventional proportional-integral-derivative (PID) controllers to more advanced configurations. For example, some designs have replaced conventional boost converters with PWM rectifiers, while others have implemented sliding mode control and multi-input buck-boost converters to regulate power flow and improve stability.

Despite their popularity, PID controllers are limited in their ability to handle the nonlinear, time-varying dynamics inherent in renewable energy systems. Recent advancements have introduced fractional-order control (FOC) techniques, including fractional-order PID (FOPID) controllers, which offer improved tuning flexibility, enhanced robustness against uncertainties, and superior dynamic performance. These controllers have shown promise in managing complex power systems, particularly those involving renewable generation and variable loads.

The stability and performance of renewable energy systems are also heavily dependent on energy storage solutions. Various technologies, such as batteries, flywheels, compressed air storage, and ultracapacitors, are employed to buffer energy and maintain system balance. Among these, batteries are the most widely used due to their energy density and operational reliability. Nevertheless, batteries alone are often insufficient for handling high-power transients, leading to increased degradation and reduced lifespan.

Hybrid energy storage systems (HESS) that combine ultracapacitors with batteries offer a compelling alternative. Ultracapacitors provide high power density and fast charge-discharge capability, making them suitable for smoothing short-term power fluctuations, while batteries supply long-term energy storage. This hybrid approach allows for decoupling of power and energy demands, thereby improving overall system efficiency, reducing stress on batteries, and extending component lifespans.

UC-battery HESS architectures have found success in applications such as electric vehicles, where they reduce the impact of frequent load variations and regenerative braking cycles. These systems are also being explored for off-grid renewable energy applications. However, a key challenge in deploying ultracapacitors is the significant capacitance required to meet power demands, which can lead to increased cost, weight, and space requirements.

Accordingly, there remains a need for improved control strategies that can reduce the required capacitance of ultracapacitors in hybrid energy storage systems without compromising performance.

SUMMARY

Aspects of the disclosure provide a control system for controlling a direct current (DC) link voltage of a hybrid energy storage system (HESS). The control system includes a fractional-order proportional integral (FOPI) controller configured to receive a voltage difference between the DC link voltage and a predetermined reference voltage and generate a reference charging current based on the voltage difference, a hysteresis controller configured to receive a current difference between the reference charging current and a charging current of the HESS and generate a control signal based on the current difference, and a logic circuit configured to receive the control signal and manage charging and discharging procedures of the HESS based on the control signal, so that the DC link voltage of the HESS is maintained to be constant at the predetermined reference voltage, where the FOPI controller is configured with parameters set based on a metaheuristic technique. In an embodiment, the logic circuit is configured to manage the charging and discharging procedures of the HESS by controlling a duty cycle of a bidirectional DC-DC converter of the HESS.

In an embodiment, the bidirectional DC-DC converter is connected between a DC link of the HESS corresponding to the DC link voltage and a storage battery of the HESS.

In an embodiment, the charging current of the HESS is a battery current of the storage battery of the HESS.

In an embodiment, an ultra-capacitor of the HESS is directly connected to the DC link of the HESS.

In an embodiment, the metaheuristic technique includes gorilla troop optimization (GTO). In an embodiment, the configured parameters of the FOPI controller are set by generating multiple sets of preliminary parameters of the FOPI controller based on the GTO, obtaining multiple results from a cost function each corresponding to a respective set of preliminary parameters of the FOPI controller, and selecting one of the multiple sets of preliminary parameters as the configured parameters of the FOPI controller based on the multiple results of the cost function.

In an embodiment, the result corresponding to the configured parameters is lowest among the multiple results from the cost function.

In an embodiment, the obtaining the multiple results from the cost function includes for each set of preliminary parameters of the FOPI controller, generating a respective DC link voltage, and for each DC link voltage, calculating an integral square error of the respective DC link voltage relative to the predetermined reference voltage.

In an embodiment, generating the respective DC link voltage includes measuring the respective DC link voltage over a predetermined period of time, and the calculating the integral square error of the respective DC link voltage relative to the predetermined reference voltage includes calculating the integral square error of the respective DC link voltage relative to the predetermined reference voltage over the predetermined period of time.

Aspects of the disclosure provide a method of controlling a direct current (DC) link voltage of a hybrid energy storage system (HESS). The method includes receiving, by a fractional-order proportional integral (FOPI) controller, a voltage difference between the DC link voltage and a predetermined reference voltage, generating, by the FOPI controller, a reference charging current based on the voltage difference, receiving, by a hysteresis controller, a current difference between the reference charging current and a charging current of the HESS, generating, by the hysteresis controller, a control signal based on the current difference, receiving, by a logic circuit, the control signal, and managing, by the logic circuit, charging and discharging procedures of the HESS based on the control signal, so that the DC link voltage of the HESS is maintained to be constant at the predetermined reference voltage, where the FOPI controller is configured with parameters set based on a metaheuristic technique.

In an embodiment, the managing the charging and discharging procedures of the HESS includes controlling, by the logic circuit, a duty cycle of a bidirectional DC-DC converter of the HESS.

In an embodiment, the bidirectional DC-DC converter is connected between a DC link of the HESS corresponding to the DC link voltage and a storage battery of the HESS.

In an embodiment, the charging current of the HESS is a battery current of the storage battery of the HESS.

In an embodiment, an ultra-capacitor of the HESS is directly connected to the DC link of the HESS.

In an embodiment, the metaheuristic technique includes gorilla troop optimization (GTO). In an embodiment, the configured parameters of the FOPI controller are set by generating multiple sets of preliminary parameters of the FOPI controller based on the GTO, obtaining multiple results from a cost function each corresponding to a respective set of preliminary parameters of the FOPI controller, and selecting one of the multiple sets of preliminary parameters as the configured parameters of the FOPI controller based on the multiple results of the cost function.

In an embodiment, the result corresponding to the configured parameters is lowest among the multiple results from the cost function.

In an embodiment, the obtaining the multiple results from the cost function includes: for each set of preliminary parameters of the FOPI controller, generating a respective DC link voltage, and for each DC link voltage, calculating an integral square error of the respective DC link voltage relative to the predetermined reference voltage.

In an embodiment, the generating the respective DC link voltage includes measuring the respective DC link voltage over a predetermined period of time, and the calculating the integral square error of the respective DC link voltage relative to the predetermined reference voltage includes calculating the integral square error of the respective DC link voltage relative to the predetermined reference voltage over the predetermined period of time.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
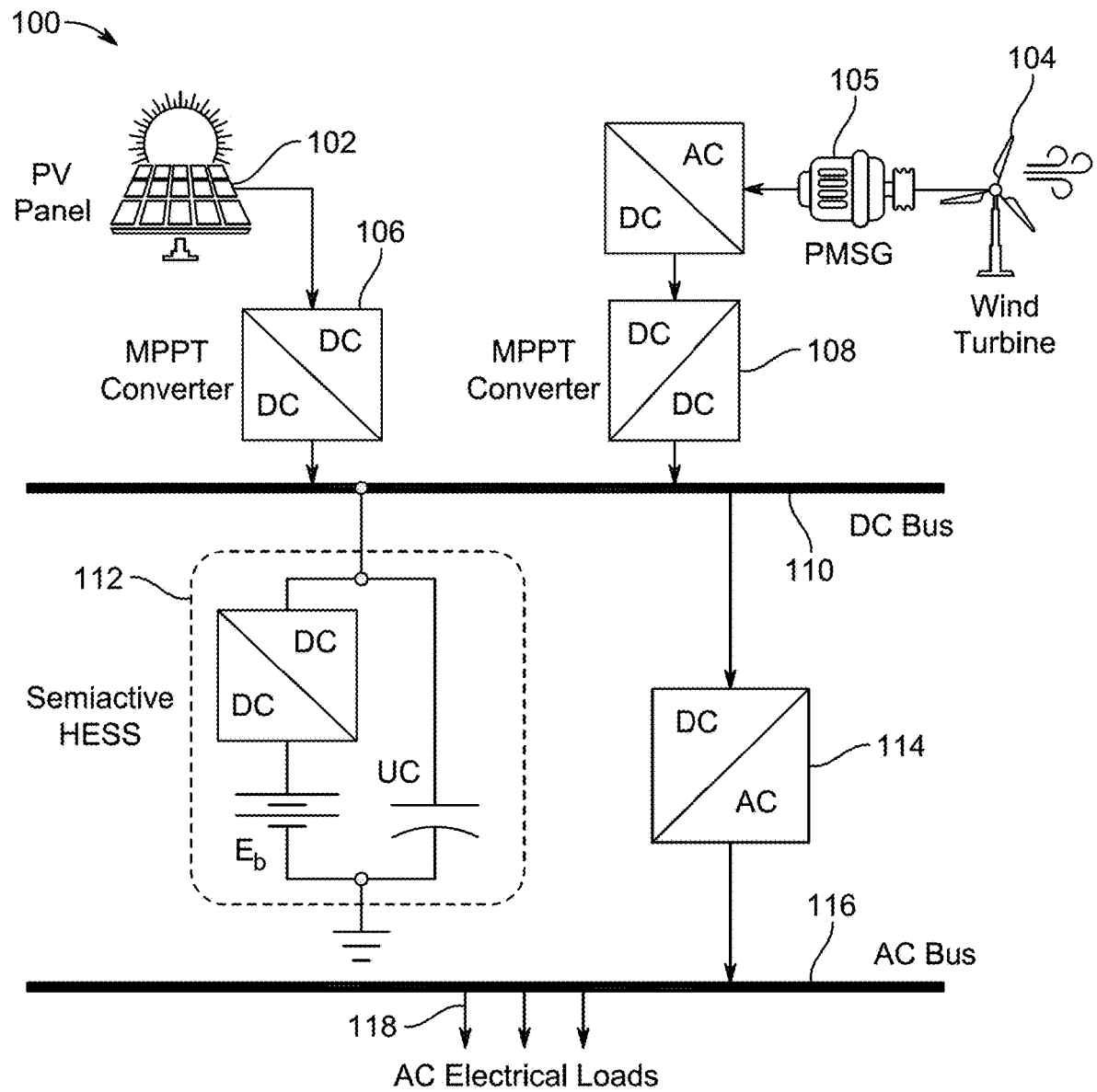
FIG. 1A illustrates a power circuit topology of a disclosed microgrid system, according to some embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to reducing the required capacitance of an ultracapacitor (UC) in hybrid energy storage systems (HESS) utilizing optimal controllers. Standalone microgrids powered by renewable energy sources offer a promising solution for rural electrification and reduced dependence on centralized utility grids. However, their nonlinear and time-varying characteristics present significant challenges in energy management. This disclosure describes a control strategy employing a fractional-order proportional-integral (FOPI) controller optimized using the Gorilla Troop Optimization (GTO) algorithm to enhance microgrid performance and stability. The system integrates a hybrid energy storage scheme comprising an ultracapacitor (UC) and a battery, and is primarily powered by wind and solar energy. Comparative simulation results demonstrate that the FOPI controller significantly outperforms conventional PI controllers in maintaining voltage and frequency stability under varying wind speeds, solar irradiance, and load conditions. The disclosed controller ensures precise energy exchange between the battery and UC, reducing the reliance on large-capacitance UCs and thereby minimizing system cost, size, and weight. The disclosure uses semi-passive HESS.

In conventional passive HESS topology, the high-power storage (HPS), such as a supercapacitor/ultracapacitor, and high-energy storage (HES), such as a battery, are directly connected to a common bus without power converters. Power sharing between the HPS and the HES is governed by their internal impedances, akin to parallel synchronous generators, with factors such as state of charge and temperature influencing resistance. In a battery-ultracapacitor configuration, the ultracapacitor's low impedance allows it to absorb high-power pulses, acting as a low-pass filter that smooths power variations and protects the battery from stress. The power balance is maintained according to:

$$P_s = \begin{cases} P_g - P_l \\ P_{HPS} + P_{HES} \end{cases}; \quad (1)$$

where $P_g$, $P_s$, $P_l$, $P_{HPS}$, $P_{HES}$ are power produced, power transferred by HESS, power used by the load, and power supplied by HPS and HES, respectively. It is noted that the power transferred by HESS ($P_s$) is the sum of power from HPS ($P_{HPS}$) and HES ($P_{HES}$), ensuring the load demand is met efficiently through impedance-based distribution. The passive HESS topology is initially introduced in battery-UC hybrid vehicles and applications with pulsed loads. The passive HESS topology is later extended to power system domains, particularly in isolated microgrids, where battery-UC configurations with passive connectivity helped mitigate the intermittency of RES. Despite its simplicity and cost-effectiveness, the passive topology suffers from several limitations. Most important among the limitations include a lack of power control flexibility due to dependence on the internal resistance of energy storage components, increased vulnerability because the storage units are directly tied to the power system, and the strict requirement for matching the DC link/load voltage with the voltage of the energy storage devices. These constraints have limited its widespread adoption.

To overcome these drawbacks, an active HESS topology is employed. The active HESS topology employes a split bidirectional DC-DC converter, enabling independent control of the HPS and the HES units. The active HESS architecture offers maximum controllability, allowing for the strategic use of the complementary characteristics of both storage types and supporting the implementation of diverse energy management and control methodologies. However, these advantages come at the expense of increased power conversion losses and higher converter costs. The power exchanged by the active HESS in this topology is represented by the expression:

$$P_s = \mu P_{HPS} + \alpha P_{HES}; \quad (2)$$

where $\mu$ and $\alpha$ are controllability coefficients determined by control strategies based on parameters such as state of charge (SOC), power fluctuation frequency, and battery degradation rate. The active HESS topologies are predominantly used in power system applications and are classified into series and parallel configurations. The parallel active topology, which utilizes separate converters for each storage unit, is favored for its design flexibility and fault tolerance, while the series topology is less common due to the need for converters rated for the full system power.

Further, semiactive HESS topology is introduced. The semiactive HESS topology builds upon the passive configuration by introducing a single bidirectional DC-DC converter dedicated to managing power flow from the HPS, comprising a ultracapacitor, while the HES, such as a battery, remains directly connected to the DC bus. The power flow in this topology is described by equation:

$$P_s = \mu P_{HPS} + P_{HES}; \quad (3)$$

where $\mu$ represents the controllability of the HPS and determines its power contribution. In this setup, the HPS is responsible for handling peak power demands, while the HES addresses the remaining load. Studies have examined variations of the semi-active topology where either the battery or the UC is controlled. However, challenges arise depending on the configuration: a controlled UC requires an oversized converter to handle pulse power, while a regulated battery setup results in DC link voltage fluctuations.

A notable application of the semi-active topology includes remote microgrids powered by wind energy, where hybrid systems combining batteries and superconducting magnetic energy storage (SMES) have been used to dampen high-frequency fluctuations, thereby enhancing battery longevity. Another common variant connects the battery directly to the DC bus while the UC is interfaced via a bidirectional DC-DC converter. The variant design connects the battery directly to the DC bus while the UC is interfaced via a bidirectional DC-DC converter, enhancing the UC's volumetric efficiency by allowing a broader operational voltage range and ensuring DC bus voltage stability through the battery's direct link. Despite offering better control than passive systems, semi-active configurations still suffer from drawbacks such as voltage fluctuations and the need for DC-DC converters that can handle large power transients. These power spikes can stress the battery, reducing its lifespan. Control strategies for this topology range from classical methods such as filtration-based, rule-based, deadbeat, and droop controllers, to advanced intelligent techniques such as model predictive control, fuzzy logic, and robust control, allowing flexible and efficient system operation.

FIG. 1A illustrates a microgrid system 100 according to embodiments of the disclosure. The microgrid system 100 is based on a hybrid renewable energy-based power generation and distribution system, and is configured to supply electrical energy to one or more Alternating Current (AC) electrical loads 118. The microgrid system 100 includes a Photovoltaic (PV) panel array 102, a wind turbine 104, a Maximum Power Point Tracking (MPPT) converter (Direct Current (DC)-DC converter) 106 for the PV panel array 102, a MPPT converter (DC-DC converter) 108 for the wind turbine 104, a DC bus 110, a HESS 112, a DC-AC inverter 114, an AC bus 116, and AC electrical loads 118.

The PV panel array 102 is configured to harness solar energy and convert it to direct current (DC) electrical energy. The PV panel array 102 comprises multiple solar modules arranged in a plurality of strings, each containing a plurality of solar modules. The output of the PV panel array 102 is a variable DC voltage dependent on incident solar radiation. To ensure maximum power extraction under dynamic environmental conditions, the output of the PV panel array 102 is coupled to the MPPT converter 106. The MPPT converter 106 is realized as a DC-DC boost converter, which elevates and regulates the voltage level before delivering power to the common DC bus 110. The MPPT converter 106 operates to maximize the energy extraction from the PV array under varying irradiance conditions and outputs a regulated DC voltage onto a common DC bus 110.

In parallel to power generation using solar energy, a wind turbine 104 is electrically and mechanically coupled to a three-phase Permanent Magnet Synchronous Generator (PMSG) 105. The PMSG 105 produces an AC output that is rectified via an uncontrolled AC-DC converter. The resulting unregulated DC voltage is input to the second MPPT converter 108, also implemented as a DC-DC boost converter. The output of the PMSG 105 is alternating current (AC), which is rectified by an uncontrolled AC-DC converter to yield an unregulated DC voltage. This unregulated voltage is input to a second MPPT converter 108, also implemented as a DC-DC boost converter. The second MPPT converter 108 regulates the generator's operating point to achieve maximum power extraction from the wind turbine 104, and its output is similarly coupled to the DC bus 110.

To address the intermittency of the renewable energy sources, the system incorporates the HESS 112. In an embodiment, the HESS may be a semi-active HESS 112. The HESS 112 includes two storage components: an ultracapacitor (UC) and a bank of batteries (for example, Lead-acid, Lithium-Ion) (not shown) configured in a series-parallel arrangement. The UC is directly interfaced with the DC bus 110, providing an immediate response to transient changes in load or generation. The battery bank is coupled to the DC bus via a bidirectional DC-DC converter, which modulates the charge and discharge behaviour of the batteries.

The semi-active configuration of the HESS 112 enables dynamic energy balancing within the microgrid system 100. A bidirectional converter serves as a primary actuator for regulating the flow of energy into and out of the battery bank, maintaining the voltage of the DC bus 110 within prescribed limits and enhancing overall system stability.

The collective DC output from the PV panel array 102, the wind turbine 104, and the HESS 112 is delivered to a DC-AC inverter 114, which converts the DC power into AC power for consumption by one or more AC electrical loads 118 connected to the AC bus 116. The DC-AC inverter 114 ensures proper synchronization and voltage regulation of the AC output, suitable for grid-connected or standalone operation.

A control system for the HESS 112 is introduced using a controller. The principal objective of the controller is to regulate the DC-link voltage, which is achieved by controlling the charging operation of the semi-active the HESS 112. An exemplary conventional control system for the semi-active HESS 112 is provided in FIG. 1B. An implementation control system of the disclosure is provided in FIG. 2A.

Figure 1B:
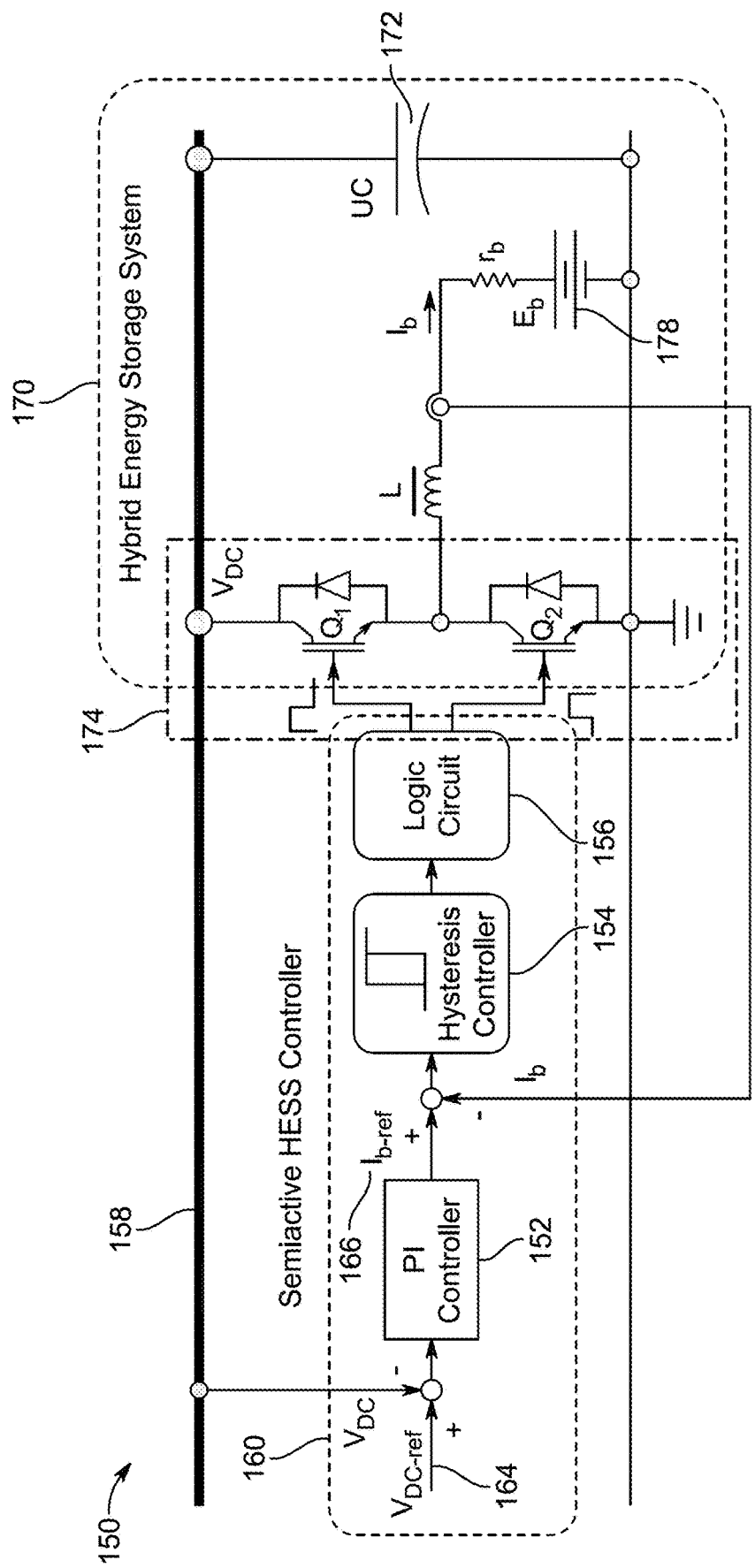
FIG. 1B illustrates a schematic of a conventional semi-active HESS control architecture for stabilizing the microgrid system of FIG. 1A, according to some embodiments.

FIG. 1B illustrates a schematic of a conventional semi-active HESS control architecture 150 for stabilizing the DC microgrid system 100. The conventional semi-active HESS control architecture 150 includes two principal blocks: a conventional semi-active HESS controller 160, and a HESS 170, which are electrically connected through a DC bus 158. The HESS 170 includes energy storage devices comprising a UC 172 and a battery 178, a bidirectional DC-DC converter 174, and an inductor L for current smoothing. $r_b$ represents an equivalent internal resistance of the battery 178, Eb represents a battery voltage of the battery 178, and It represents a battery current of the battery 178. The semi-active HESS controller 160 includes a conventional Proportional-Integral (PI) controller 152, a hysteresis controller 154, and a logic circuit 156. $V_{DC}$ represents a DC bus voltage on the DC bus 158, $V_{DC\text{-}ref}$ 164 represents a DC reference voltage that $V_{DC}$ needs to be maintained at.

The semi-active HESS controller 160, and the HESS 170 subsystems are interconnected to dynamically coordinate power flow between the DC bus 158 and energy storage devices (e.g., the UC 172 and the battery 178), thereby ensuring system voltage stability and compensating for renewable energy intermittency.

The DC bus 158 serves as the primary electrical conduit to which various distributed energy resources and AC/DC loads are connected. The voltage reference signal $V_{DC\text{-}ref}$ 164 represents the target voltage level to be maintained on the DC bus 158. The actual bus voltage $V_{DC}$ is continuously monitored and subtracted from $V_{DC\text{-}ref}$ 164, resulting in a voltage error signal. The error is input into the PI controller 152, which dynamically adjusts its output to minimize the deviation from a setpoint. The PI controller 152 processes the error using proportional and integral actions to generate a battery current reference signal $I_b$-ref 166. The reference signal $I_b$-ref 166 indicates the required charge or discharge current for the hybrid energy storage system 170 in order to stabilize the DC bus voltage $V_{DC}$. The current reference $I_{b\text{-}ref}$ 166 is compared against the battery current $I_b$ using the hysteresis controller 154. The hysteresis controller 154 ensures that $I_b$ tracks $I_b$-ref 166 within a narrow allowable band, thereby generating a binary or pulse-width-modulated control signal. The control signal is processed by the logic circuit 156, which interprets the control signal to generate gate-driving signals for power electronic switches ($Q_1$ and $Q_2$) of the bidirectional DC-DC converter 174 within the hybrid energy storage system 170.

The power electronic switches $Q_1$ and $Q_2$ of the bidirectional DC-DC converter 174 can be implemented, for example, using MOSFETs or IGBTs equipped with antiparallel diodes. The bidirectional DC-DC converter 174 is interfaced with the DC bus 158 and regulates current flow through the energy-buffering inductor L. The inductor L serves to smooth out current transitions during charge and discharge operations, limiting current ripple and ensuring safe operation of the energy storage devices.

The hybrid energy storage system 170 includes the UC 172 and the battery 178 modeled as the voltage source Eb in series with its internal resistance $r_b$. The ultra-capacitor 172 is directly connected to the DC bus 158, enabling it to respond rapidly to transient variations in load or generation, without any active switching interface. The battery 178 is connected through the bidirectional DC-DC converter 174 controlled by $Q_1$ and $Q_2$, allowing the HESS controller 160 to regulate the flow of energy into or out of the battery 178 based on the architecture conditions.

In operation, when the DC bus voltage $V_{DC}$ 160 falls below the reference value $V_{DC\text{-}ref}$ 164, the PI controller 152 initiates a battery discharge mode by setting the $I_b$-ref 166 as a positive reference current. The positive reference current causes the logic circuit 156 to activate the appropriate switch (e.g., $Q_1$), allowing current to flow from the battery 178 into the DC bus 158. Conversely, if $V_{DC}$ exceeds $V_{DC\text{-}ref}$, the PI controller 152 sets the Ip-ref 166 as a negative current reference, prompting the logic circuit 156 to enter a charging mode via the activation of the opposite switch (e.g., $Q_2$), thereby drawing current from the DC bus 158 into the battery 178.

The architecture 150 enables the semi-active HESS controller 160 to maintain the DC bus voltage regulation in real time, with the battery 178 handling low-frequency energy balancing and the UC 172 absorbing high-frequency transients. The combination of the battery 178 and the UC 172 enhances a response speed of the architecture 150, reduces cycling stress on the battery 178, and promotes efficient energy utilization in microgrid environments. By employing the PI controller 152, the architecture 150 achieves a balance between simplicity and performance, making it highly suitable for cost-sensitive applications where reliable voltage regulation is essential.

However, upon detailed examination and analysis of the circuit configuration of the architecture 150 comprising semi-active HESS, it has been observed that the dynamic response characteristics of the PI controller 152 exert a significant influence on the required capacitance of the connected UC 172. The implementation of the conventional PI controller 152, such as that illustrated in FIG. 1B, necessitates a significantly higher capacitance for the UC 172 to realize a comparable level of voltage regulation and dynamic response. Empirical analysis indicates that the capacitance reduction of the UC 172 that is achieved with an optimized controller configuration is on the order of approximately 300% relative to the traditional PI-controlled system. Assuming that the weight and physical dimensions of the UC 172 are directly proportional to its capacitance, and that the same ultracapacitor cell type and fabrication technology are utilized, it follows that a proportional reduction in both the weight and volumetric footprint of the UC 172 is concurrently realized. Accordingly, the optimization of the controller not only enhances the system's energy storage efficiency but also contributes to a more compact and lightweight design of the HESS, providing tangible benefits in applications where space and mass constraints are critical.

Figure 2A:
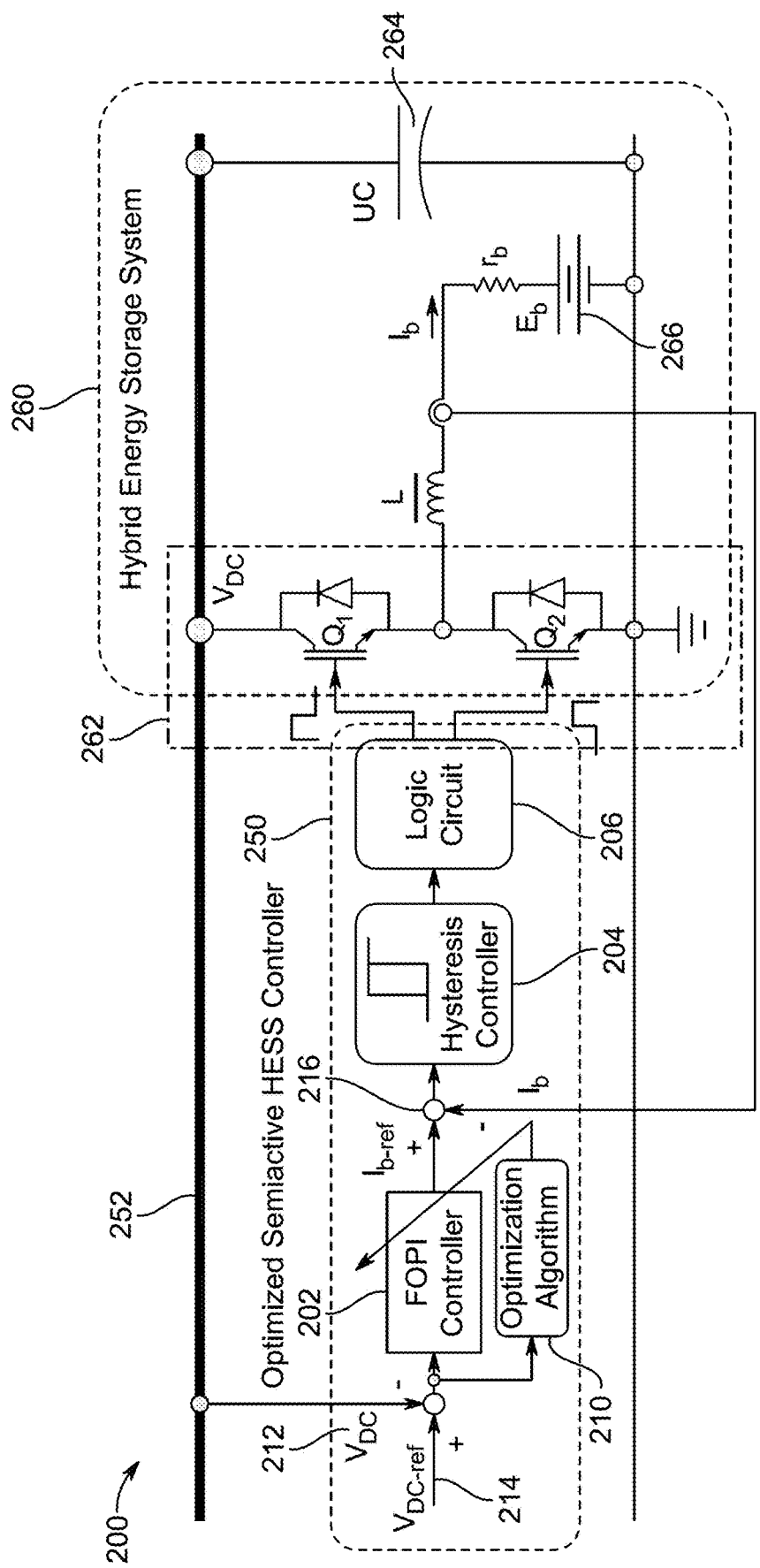
FIG. 2A illustrates a schematic of a control system for stabilizing the microgrid system of FIG. 1A, according to some embodiments.

FIG. 2A illustrates a control system 200 for stabilizing the DC microgrid system 100 according to one or more embodiments. The control system 200 includes a semiactive HESS controller 250 and a HESS 260 (for example, a semiactive HESS 260). The semiactive HESS controller 250 includes a controller configuration that includes optimization-based tuning of a fractional-order proportional-integral (FOPI) controller 202. The FOPI controller 202 is a type of feedback controller that is a significant enhancement of the conventional PI controller by permitting the integral term to have a non-integer order. The optimized semiactive HESS controller 250 further includes a hysteresis controller 204, a logic circuit 206, and an optimization algorithm system 210. The FOPI controller 202, the hysteresis controller 204, and the logic circuit 206 are electrically coupled in series. The FOPI controller 202 is driven by the optimization algorithm system 210.

In an aspect, the semiactive HESS controller 250 receives a voltage signal $V_{DC}$ 212 corresponding to a measured DC-link voltage on a DC bus 252. A reference voltage signal $V_{DC\text{-}ref}$ 214 represents a desired or nominal DC-link voltage level of the DC bus 252. The difference between $V_{DC\text{-}ref}$ 214 and $V_{DC}$ 212 is computed and supplied to the FOPI Controller 202, which is configured to generate a reference charging current $I_{b\text{-}ref}$ as a function of the voltage error. Table 1 shows an example control algorithm for the FOPI controller 202.

TABLE 1

An example control algorithm for the FOPI controller 202
FOPI controller:

% The fractional PI controller transfer function is:
% C(s) = Ap + Ai/s^lambda
function [z] = fopi(v)
e_v = v(1); % voltage error
Ap = v(2); % proportional gain
Ai = v(3); % integral gain
lambda = v(4); % integral fractional order λ
s = fotf('s'); % Define the Laplace variable as fractional-order
C = Ap + Ai/s^lambda; % Fractional-order PI controller
z(1) = C*e_v; % controller output The FOPI controller 202 is configured with control parameters that are derived through an optimization algorithm, such as Gorilla Troops Optimization (GTO), to ensure optimal system response characteristics. The optimization algorithm, which is obtained from the optimization algorithm system 210, iteratively selects control parameter sets, evaluates a cost function (e.g., integral squared error of $V_{DC}$, and chooses the parameter set yielding a lowest cost).

The output $I_{b\text{-}ref}$ of the FOPI controller 202 is compared with the actual charging current $I_b$ of the HESS 260 at a node 216, and a resulting current difference or current error signal is provided to the hysteresis controller 204. The hysteresis controller 204 is configured to produce a control signal based on the sign and magnitude of the current error and communicates the control signal to the logic circuit 206. Table 2 shows an example control algorithm for the hysteresis controller 204.

TABLE 2

Figure 2B:
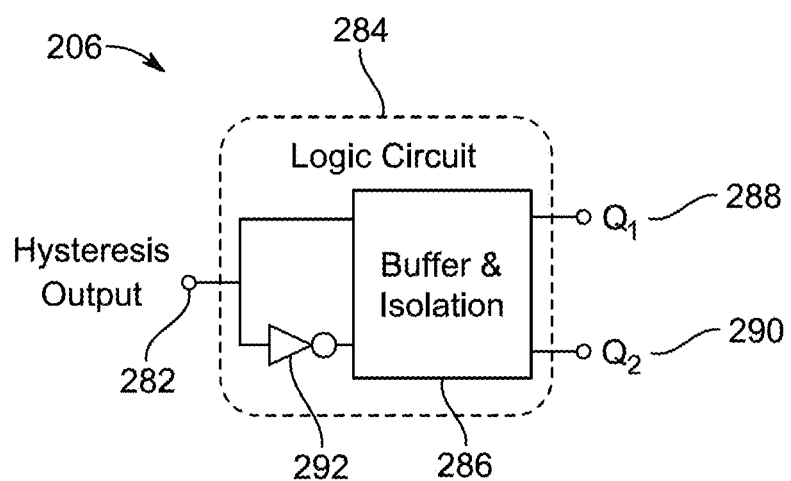
FIG. 2B is a schematic diagram of a logic circuit component of the control system of FIG. 2A, according to some embodiments.

An example control algorithm for the hysteresis controller 204
Hysteresis controller:

function [y] = hystr(x)
e_i = x(1); % current error
$I_{n-1}$ = x(2); % controller output the previous sample
h = 0.2;
If (e_i >= h/2) I = 1; end
If (e_i <= -h/2) I = 0; end
If (h/2 > e_i > -h/2) I = $I_{n-1}$; end
y(1) = I; % controller output The logic circuit 206 processes the control signal and generates gate control signals for a bidirectional DC-DC converter circuit 262 in the HESS 260. The logic circuit 206 is described in FIG. 2B. The logic circuit 206 receives the hysteresis output 282 of the hysteresis controller 204 as input. The logic circuit 206 includes a logic inverter component 292 and a buffer and isolation component 286. The logic inverter component 292 generates an inverted signal for the hysteresis output 282. The buffer and isolation component 286 receives the hysteresis output 282 and the inverted hysteresis output 282 and output signals to drive the transistors $Q_1$ 288 and $Q_2$ 290. The buffer and isolation component 286 can shape and amplify the received hysteresis signals. The isolation can be achieved through optocouplers or a bootstrap technique. The buffer component helps shape and amplify the input signals to ensure they are strong enough to drive the base or gate of the transistors $Q_1$ 288 and $Q_2$ 290 and to ensure proper switching operation. The logic circuit 206 is configured to manage charging and discharging procedures of the HESS 260 based on the control signal, so that the DC link voltage $V_{DC}$ 212 of the HESS 260 is maintained to be constant at the predetermined reference voltage $V_{DC\text{-}ref}$ 214.

Referring back to FIG. 2A, the DC-DC converter circuit 262 includes a pair of controllable switches $Q_1$ and $Q_2$ (for example, in the form of transistors). At least one of the transistors ($Q_1$, $Q_2$) operates in an opposite mode compared to the other transistor. Thus, the logic circuit 206 ensures that the gate inputs to the transistors are opposite. The transistors ($Q_1$, $Q_2$) are configured to facilitate bidirectional energy flow between the DC link 252 and a storage battery 266 defined by elements $E_b$ (battery voltage source) and $r_b$ (internal resistance). The DC-DC converter circuit 262 further includes an inductor L, which limits the rate of change of current and smooths transitions during charging and discharging.

The hybrid energy storage system 260 also includes a UC 264 directly connected across the DC link 252 to buffer transient fluctuations and provide high-speed energy compensation. The current $I_b$ flowing into or out of the battery 266 is controlled to follow $I_{b\text{-}ref}$, ensuring that the DC-link voltage $V_{DC}$ 212 is regulated to the reference value $V_{DC\text{-}ref}$ 214. The control structure features two cascaded control loops:
- An outer voltage loop, comprising the FOPI Controller 202, is responsible for maintaining the stability of the DC-link voltage $V_{DC}$ 212. The outer voltage loop operates by continuously adjusting the battery charging reference current $I_{b\text{-}ref}$ based on deviations in $V_{DC}$ 212.
- An inner current loop, formed by the hysteresis controller 204 and the logic circuit 206, rapidly regulates the actual battery current $I_b$ to track $I_{b\text{-}ref}$ with minimal deviation.

In accordance with classical cascaded control design principles, the inner loop is designed to be faster than the outer loop for stability and responsiveness. The hierarchical control architecture based on the loop enables stable regulation of the DC-link voltage with minimal reliance on high-capacitance storage devices.

The semiactive HESS controller 250 permits a significant reduction in the required capacitance of the UC 264, potentially by up to approximately 300%, while maintaining equivalent voltage regulation performance compared to conventional PI controllers (e.g., the controller 160). Such a reduction in capacitance directly translates into lower weight, volume, and cost, assuming identical UC technology is used. Consequently, system efficiency and integration flexibility are enhanced.

To validate the HESS control system of FIG. 2A, the system 100, shown in FIG. 1A, is implemented using specifications provided in Table 3.

TABLE 3

| Specifications for the system 100 | | |
|---|---|---|
| System Element | Variable | |
| Wind Turbine | Wind speed | 3.5-25 m/s |
| | Power | 10 KW |
| HESS (Battery/UC) | $I_b$, $V_b$ | 800 Ah, 300 V |
| | UC | 1 F |
| AC Bus | Voltage, frequency | 220 V, 50 Hz |
| DC Bus | Voltage | 500 V |
| PV | MPPT | 5440 W |
| | $I_{sc}$, $V_{oc}$ | 22.8 A, 316.5 V |

To evaluate the transient response and control robustness of the disclosed microgrid system 100 under various disturbances, the microgrid is subjected to three distinct types of perturbations: (i) wind speed fluctuations, (ii) solar irradiance variations, and (iii) abrupt changes in AC load power demand. The disturbance profiles are illustrated in FIGS. 3A-3C.

Figure 3A:
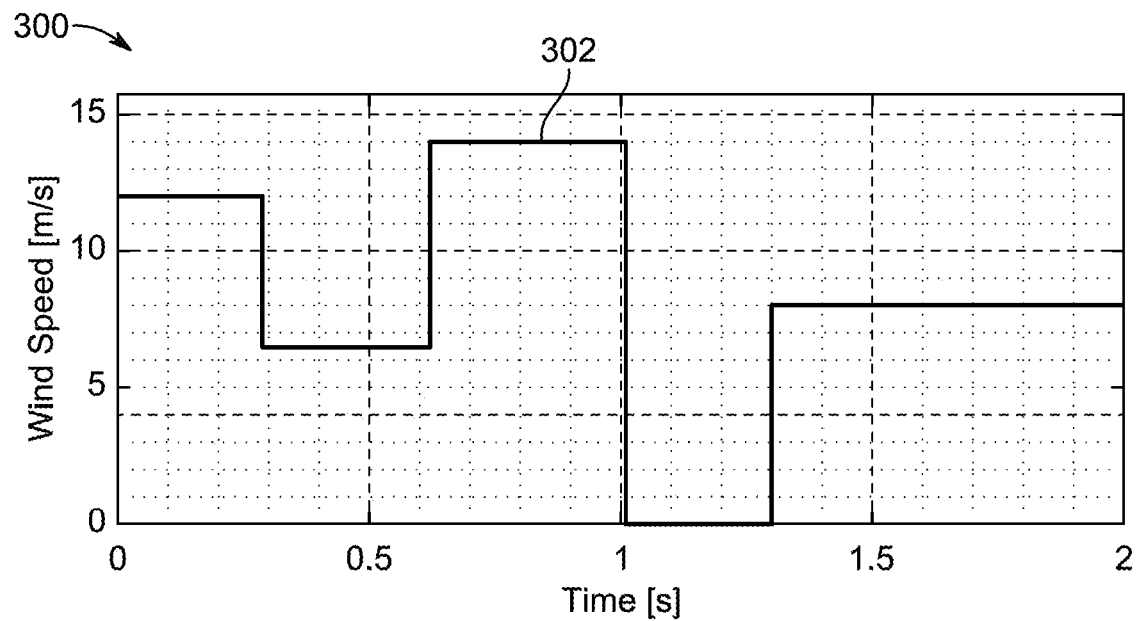
FIG. 3A illustrates a plot of wind speed versus time, depicting stepwise changes to emulate realistic wind disturbance conditions in environment of the microgrid, according to some embodiments.

FIG. 3A illustrates a plot 300 of wind speed (in m/s) versus time (in seconds), depicting stepwise changes to emulate realistic wind disturbance conditions in the microgrid environment. As shown in FIG. 3A, wind speed variations are applied in a stepwise manner and are represented by trace 302. The wind speed begins at 12 meters per second (m/s) at time t=0 seconds, subsequently drops to 6.5 m/s at t=0.29 s, increases to 14 m/s at t=0.62 s, drops to 0 m/s at t=1.0 s, and finally rises to 8 m/s at t=1.3 s. These discrete wind disturbances simulate typical fluctuations in wind energy resources.

Figure 3B:
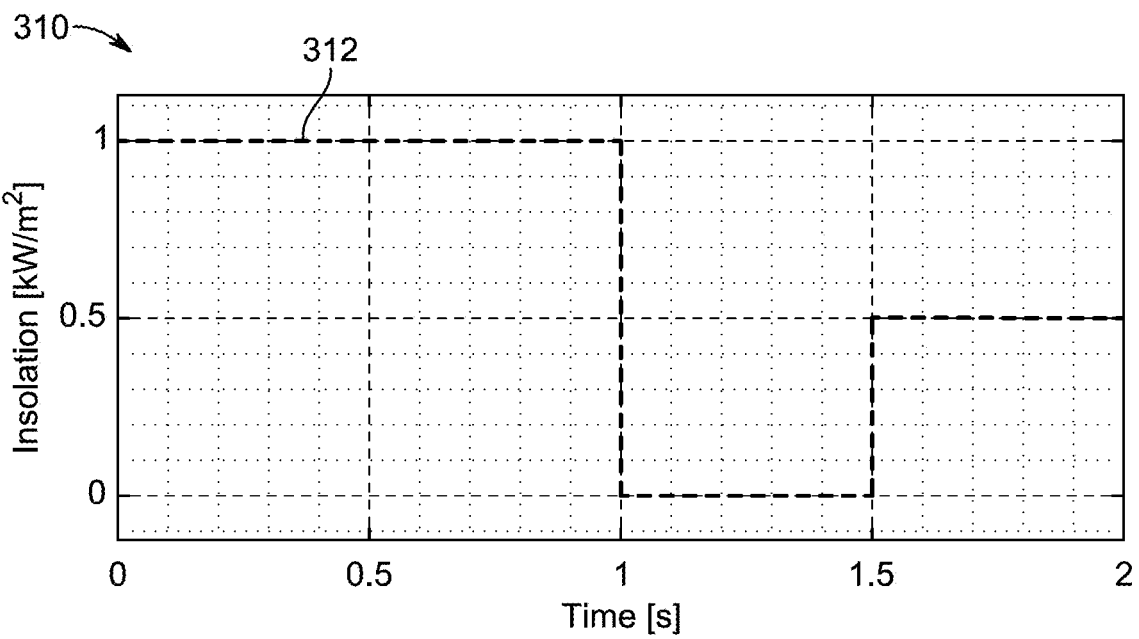
FIG. 3B depicts a plot of solar irradiance versus time, where irradiance steps are applied to test a photovoltaic (PV)-side response of a controller to rapid irradiance transitions, according to some embodiments.

FIG. 3B depicts a plot 310 of solar irradiance (in kW/m²) versus time (in seconds), where irradiance steps are applied to test the PV-side controller's response to rapid irradiance transitions. As shown in FIG. 3B, solar irradiance, represented by trace 312, is subjected to discrete step changes intended to model shading events and cloud intermittency. The irradiance is initially 1 kilowatt per square meter (kW/m²) at t=0 s, drops to 0 kW/m² at t=1.0 s, and rises to 0.5 kW/m² at t=1.5 s.

Figure 3C:
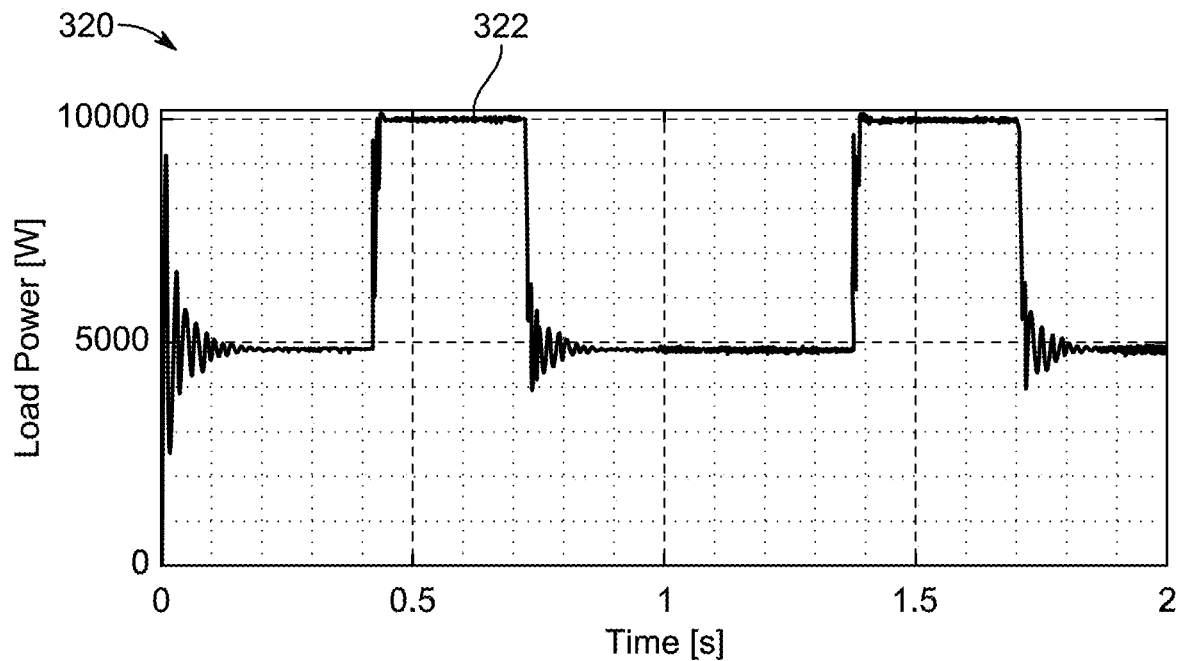
FIG. 3C illustrates a plot of a load power plotted against time, with transitions in load level designed to assess ability of the system to maintain DC bus stability during load transients, according to some embodiments.

FIG. 3C illustrates a plot 320 of a load power (in watts) plotted against time (in seconds), with clear transitions in load level designed to assess the system's ability to maintain DC bus stability during load transients. As shown in FIG. 3C, the AC load demand, shown by trace 322, undergoes a series of abrupt changes between 100% and 50% of full load. Specifically, load transitions occur at t=0 s, 0.42 s, 0.72 s, 1.38 s, and 1.7 s, simulating realistic load dynamics due to user demand or appliance cycling.

Figure 3D:
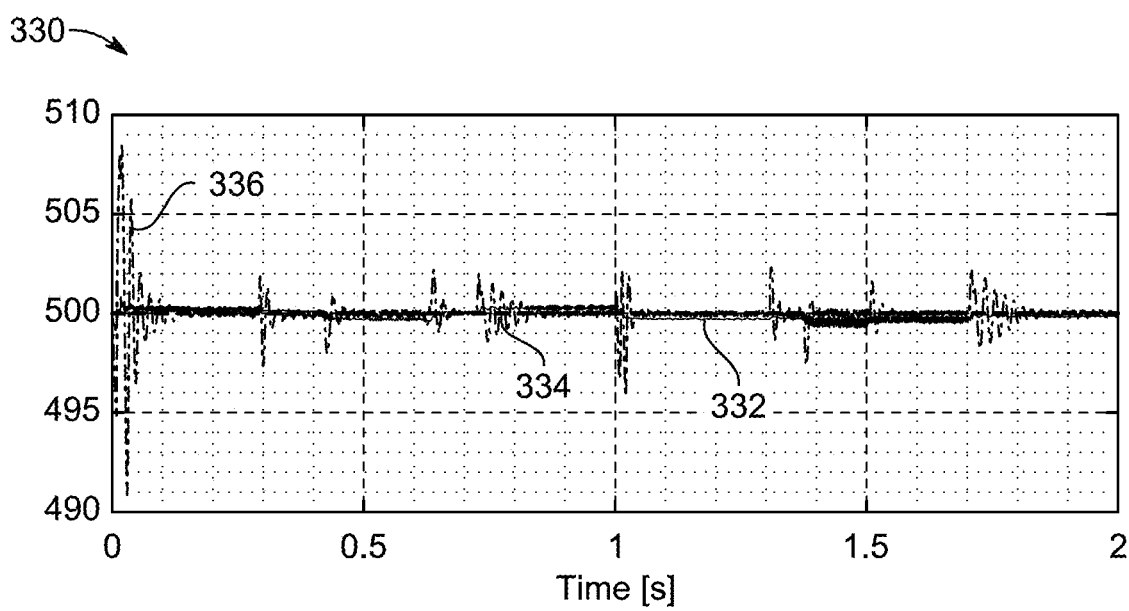
FIG. 3D illustrates a DC link voltage plot showing a comparative performance of the GTO-optimized FOPI controller and conventional Proportional-integral (PI) controller, according to some embodiments.

The collective impact of the above disturbances on the DC bus voltage is illustrated in FIG. 3D, which compares the voltage regulation performance under two control strategies: the GTO-tuned FOPI controller 202 and the conventional PI controller 152, both attempting to regulate the bus voltage to a reference of 500 volts (referred to as "$V_{DC\text{-}Ref}$").

FIG. 3D presents the DC link voltage ($V_{DC}$) response (represented by 334) in volts over time (in seconds), showing the comparative performance of the GTO-optimized FOPI controller 202 (represented by 332) and conventional PI controller 152 (represented by 336) under the compound disturbance profile without having the UC.

The GTO-optimized FOPI controller 202 demonstrates superior transient performance as compared to the conventional PI controller 152. Notably, the FOPI controller 202 exhibits a maximum overshoot of only approximately 0.2%, and a rapid settling time, indicating high precision and fast damping capability. In contrast, the PI controller 152 displays a peak overshoot of approximately 3.6% and a slower settling time of about 150 milliseconds. As observed, the results validate the effectiveness of the GTO-FOPI controller 202 in maintaining voltage stability and mitigating oscillatory behaviour in a disturbance-rich operating environment. Provided below is a comparative table summarizing the aforementioned plots.

TABLE 4

Comparative performance of GTO-optimized FOPI vs. conventional PI controller

| Performance Metric | GTO-Optimized FOPI Controller 202 | Conventional PI Controller 152 |
| --- | --- | --- |
| DC Bus Voltage Reference | 500 V | 500 V |
| Maximum Overshoot | ~0.2% | ~3.6% |
| Peak Settling Time | <50 ms | ~150 ms |
| Response Under Disturbances | Highly stable and robust | Noticeable oscillations |
| Disturbance Rejection | Effective across all events | Moderate performance |
| Overall Stability Margin | High | Moderate |

In an embodiment, the UC is integrated into the semi-active HESS system to enhance the dynamic performance of the DC-link voltage under transient and steady-state conditions. When the UC is incorporated, an improvement in the DC-link voltage regulation is observed for both the PI controller 152 and the disclosed GTO-optimized FOPI controller 202. However, to achieve an equivalent level of voltage regulation and transient performance, the capacitance requirement of the UC is significantly lower when employing the optimized FOPI controller 202 compared to the conventional PI controller 152. The reduction in required capacitance directly translates into improvements in weight and volume, assuming identical unit technologies and manufacturing specifications. Accordingly, the associated reductions in the UC weight and size are proportional to the reduction in capacitance. Additionally, significant enhancement in system efficiency is achieved with the optimized FOPI controller 202. A comparative summary of these performance achievements is provided in Table 5.

TABLE 5

Comparative achievements of GTO-optimized FOPI controller 202 over conventional PI controller 152

| Parameter | GTO-Optimized FOPI Controller 202 | Conventional PI Controller 152 | Improvement (%) |
| --- | --- | --- | --- |
| Required Capacitance (F) | 0.0033 | 1.0 | −303% |
| UC Weight (%) | 0.33% | 100% | −303% |
| UC Size (%) | 0.33% | 100% | −303% |
| Efficiency (%) | 96.0 | 95.6 | +0.4% |

Figure 4:
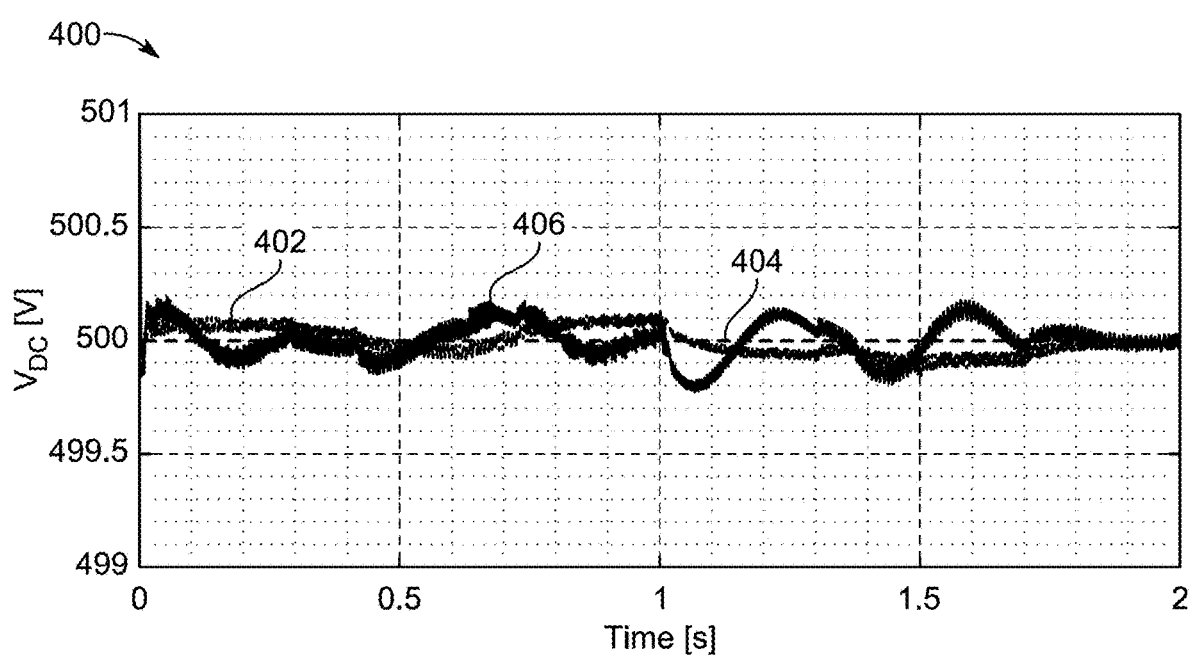
FIG. 4 illustrates a plot of a comparative DC-link voltage response of the GTO-optimized FOPI controller and the conventional PI controller under varying UC capacitance configurations, according to some embodiments.

FIG. 4 illustrates a plot 400 of comparative DC-link voltage responses of the disclosed GTO-optimized FOPI controller 202 and the conventional PI controller 152 under varying UC capacitance configurations. As shown in FIG. 4, both controllers demonstrate a voltage response closely tracking the reference value of approximately 500 V (represented by 404), thereby maintaining stability throughout the observed interval. However, as further evidenced in the figure, the disclosed optimized FOPI controller 202 achieves comparable or improved transient voltage regulation using a substantially reduced UC capacitance relative to the conventional PI controller 152. In particular, a waveform 402 corresponds to the voltage response using the optimized FOPI controller 202 with the reduced UC capacitance, while a waveform 406 corresponds to the conventional PI controller 152 requiring a significantly larger UC to achieve similar regulation. Waveform 404 illustrates the $V_{ref}$ of 500V. Based on the observation, the plot 400 demonstrates the superior performance efficiency of the optimized FOPI controller 202 in reducing component requirements, such as capacitance, size, and weight, without compromising voltage stability or the system 100 responsiveness.

In one embodiment, the disclosed control architecture is configured to regulate the DC-link voltage ($V_{DC}$) at a desired reference level ($V_{DC\text{-}ref}$) by dynamically adjusting the charge and discharge behavior of a battery energy storage system (BESS). The control architecture comprises an outer control loop implemented using the FOPI controller 202, which ensures the stability and regulation of the DC-link voltage. The inner control loop is employed in conjunction with the outer loop, wherein the inner loop governs the current flow to and from the BESS. In accordance with conventional control design principles, the inner current loop is configured to operate at a faster dynamic response relative to the outer voltage loop to ensure closed-loop system stability.

The use of fractional-order control in the outer loop introduces enhanced design flexibility and performance tuning, wherein the differential and integral components of the FOPI controller 202 may assume arbitrary real-numbered orders. The fractional calculus basis of the FOPI controller 202 enables a generalization of classical integer-order systems by applying the following mathematical relationship for a given fractional order q, wherein the operator defines a non-integer differentiation or integration process:

$$D_{a,b}^q f(t) = \begin{cases} f(t) & q = 0 \\ \dfrac{d^q}{dt^q} f(t) & q > 0 \\ \int_a^b f(t) d\tau^{-q} & q < 0 \end{cases} \quad (4)$$

where (a,b) denote the lower and upper limits, respectively, the value of the order q determines the nature of the fractional operator. Specifically, when q<0, the operator corresponds to a fractional integral, whereas when q>0, it is classified as a fractional differential operator. The fractional order concept provides a continuous spectrum between differentiation and integration, enabling enhanced controller tuning flexibility and dynamic response shaping.

Given the abstract nature of fractional calculus, several mathematical formulations have been disclosed to facilitate practical implementation and understanding. One widely adopted method is the Riemann-Liouville definition, which expresses the fractional derivative of a function as an extension of classical integer-order calculus. This technique plays a crucial role in computing the non-integer order derivatives required by the FOPI controller 202.

$$D_{a,b}^q f(t) = \frac{1}{\Gamma(k-q)} \left(\frac{d}{dt}\right)^k \int_a^b \frac{f(\tau)}{(t-\tau)^{n-k+1}} d\tau; \quad (5)$$

where $k \in K$, $q-1 < q < k$, and the Gamma function $\Gamma(x)$ is defined as:

$$\Gamma(x) = \int_0^\infty t^{x-1} e^{-t} dt; \quad (6)$$

The solution to Equation (7) can be obtained by applying the Laplace transform to the Riemann-Liouville (R-L) fractional derivative as defined in Equation (5). This transformation facilitates the analysis of fractional-order systems in the frequency domain by simplifying the computation of fractional derivatives. Additionally, Equation (8) presents the time-domain representation of the nth order derivative of the function f(t), based on Caputo's definition. Caputo's formulation is an alternative to the R-L approach and is particularly advantageous in physical system modeling because it allows for the use of conventional integer-order initial conditions. This makes Caputo's definition especially suitable for control system applications involving fractional calculus.

$$\mathcal{L}\{D_0^q f(t)\} = s^q F(s) - \sum_{z=0}^{k-1} s^z \left(D_0^{q-z-1} f(t)\right)\bigg|_{t=0}; \quad (7)$$

$$D_{a,b}^q f(t) = \begin{cases} \frac{1}{\Gamma(k-q)} \left(\int_a^b \frac{f^k(\tau)}{(t-\tau)^{1-k+q}} d\tau\right) & k-1 < q < k \\ \left(\frac{d}{dt}\right)^k f(t) & q = k \end{cases} ; \quad (8)$$

An initial condition is associated with the integral order of Equation (8) when the Laplace transform is applied. This initial condition plays a crucial role in defining the system's response and ensuring accurate modeling of dynamic behavior. The significance of this initial condition becomes evident through Equation (9), where s denotes the Laplace operator. This equation elucidates how the initial condition influences the transformed system, highlighting its important physical implications in the context of fractional-order dynamic systems.

$$\mathcal{L}\{D_0^q f(t)\} = s^q F(s) - \sum_{z=0}^{k-1} s^{q-z-1} f^{(z)}(0); \quad (9)$$

where s is the Laplace variable, F(s) is the Laplace transform of f(t), and $f^{(z)}(0)$ denotes the initial conditions of the function and its derivatives.

Performing fractional-order (FO) operations in the time domain often necessitates intricate mathematical computations. To address this challenge, the recursive approximation method is frequently employed for the practical implementation of FO operators. Alternatively, the Laplace transform of the $q^{th}$ derivative provides a mathematically tractable representation of the FO operator.

$$s^q \approx \omega_h^q \prod_{y=-K}^{K} \frac{s + \omega_y'}{s + \omega_y}; \quad (10)$$

where $$\omega_y' = \omega_b \left(\frac{\omega_h}{\omega_b}\right)^{\frac{y+K+(1-q)/2}{2K+1}}$$

$$\omega_y = \omega_b \left(\frac{\omega_h}{\omega_b}\right)^{\frac{y+K+(1+q)/2}{2K+1}}$$

$[\omega_b, \omega_h]$ is the working frequency band and (K) is the approximation order. Those parameters have the values: $\omega_b = -1000$, $\omega_h = 1000$, and $K=5$, in utilizing the Oustaloup algorithm.

In one embodiment, the FOPI controller 202 is utilized, wherein the regulator is characterized by three tuning parameters: a proportional gain $A_p$, an integral gain $A_i$, and a fractional integral order $\lambda$. The inclusion of the non-integer order $\lambda$, bounded within the range $0<\lambda<1$, allows the controller to generalize and enhance classical control strategies. Compared to conventional integer-order PI controllers, the FOPI controller 202 exhibits superior dynamic performance, including improved transient response, enhanced tracking accuracy, and increased system stability. Moreover, the controller demonstrates improved robustness and adaptability under various system disturbances and uncertainties. The transfer function H(s) of the FOPI controller in the Laplace domain is given by:

$$H(s) = A_p + \frac{A_i}{s^\lambda}; \quad (11)$$

In one embodiment, regulation of the DC-link voltage is achieved by comparing the monitored DC-link voltage to a predetermined reference voltage. The resulting voltage error is processed by the FOPI controller 202, which generates a corresponding reference signal for the desired battery current. The reference signal for the desired battery current is indicative of the required charging or discharging rate of the battery energy storage system (BESS) to maintain voltage stability.

The generated battery current reference is subsequently compared with the actual measured battery current. Based on deviation from the comparison, the FOPI controller 202 determines an appropriate control signal for modulating the duty cycle of the bidirectional DC/DC power converter. The control signal ensures that the BESS contributes to maintaining the DC-link voltage at the target reference level.

A dual-loop control architecture is employed to enhance operational safety and performance, wherein the outer voltage loop manages voltage regulation, and the inner current loop ensures that the current drawn from or injected into the battery remains within acceptable bounds, thereby providing system protection.

The optimization of the FOPI parameters is described herein. The parameter tuning of the FOPI controller 202 is carried out using a metaheuristic algorithm GTO. The GTO algorithm mitigates the subjectivity and inefficiency associated with trial-and-error approaches by executing a structured search for optimal parameter values, and enhancing the dynamic performance, precision, and robustness of a control system.

In one embodiment, the control system includes an FOPI controller (e.g., the FOPI controller 202) configured to regulate a target parameter, such as the DC link voltage in a power electronic converter or hybrid energy storage system. The operational parameters of the FOPI controller including the proportional gain, integral gain, and the fractional order are determined through a parameter optimization process utilizing the GTO algorithm. The parameter optimization process begins by generating a plurality of sets of preliminary parameters for the FOPI controller 202. These preliminary parameter sets are generated by the GTO algorithm, which explores the multi-dimensional parameter space of the controller using heuristic or metaheuristic search techniques to identify parameter combinations with potential for optimal performance. Each set of preliminary parameters is evaluated using a cost function designed to quantify the performance of the FOPI controller when configured with that parameter set. In one embodiment, this cost function is defined based on the accuracy of the DC link voltage response with respect to a predetermined reference voltage ($V_{DC-ref}$ 214). Specifically, for each set of preliminary FOPI parameters, the controller is simulated or tested to generate a corresponding DC link voltage profile under predefined operating conditions. The performance of each parameter set is then assessed by calculating an Integral Square Error (ISE) value, which is derived from the squared deviations of the DC link voltage from the reference voltage over a specified time interval. In an embodiment, the ISE is computed as the integral over time of the square of the voltage error. Once the ISE values for all candidate parameter sets have been computed, the set of preliminary parameters associated with the lowest ISE is selected as the configured parameters for the FOPI controller. The selected ISE indicates that the controller exhibits the most accurate voltage regulation performance, as determined by the minimum deviation from the reference voltage. The aforementioned process is explained below in detail.

The optimization of the FOPI controller 202 using the GTO methodology is effective in applications where traditional controller tuning methods are inadequate due to the nonlinear and dynamic nature of the system being controlled. By leveraging GTO-based optimization and a performance-driven cost function, the FOPI controller parameters can be configured to achieve optimal dynamic response and steady-state accuracy.

Figure 5A:
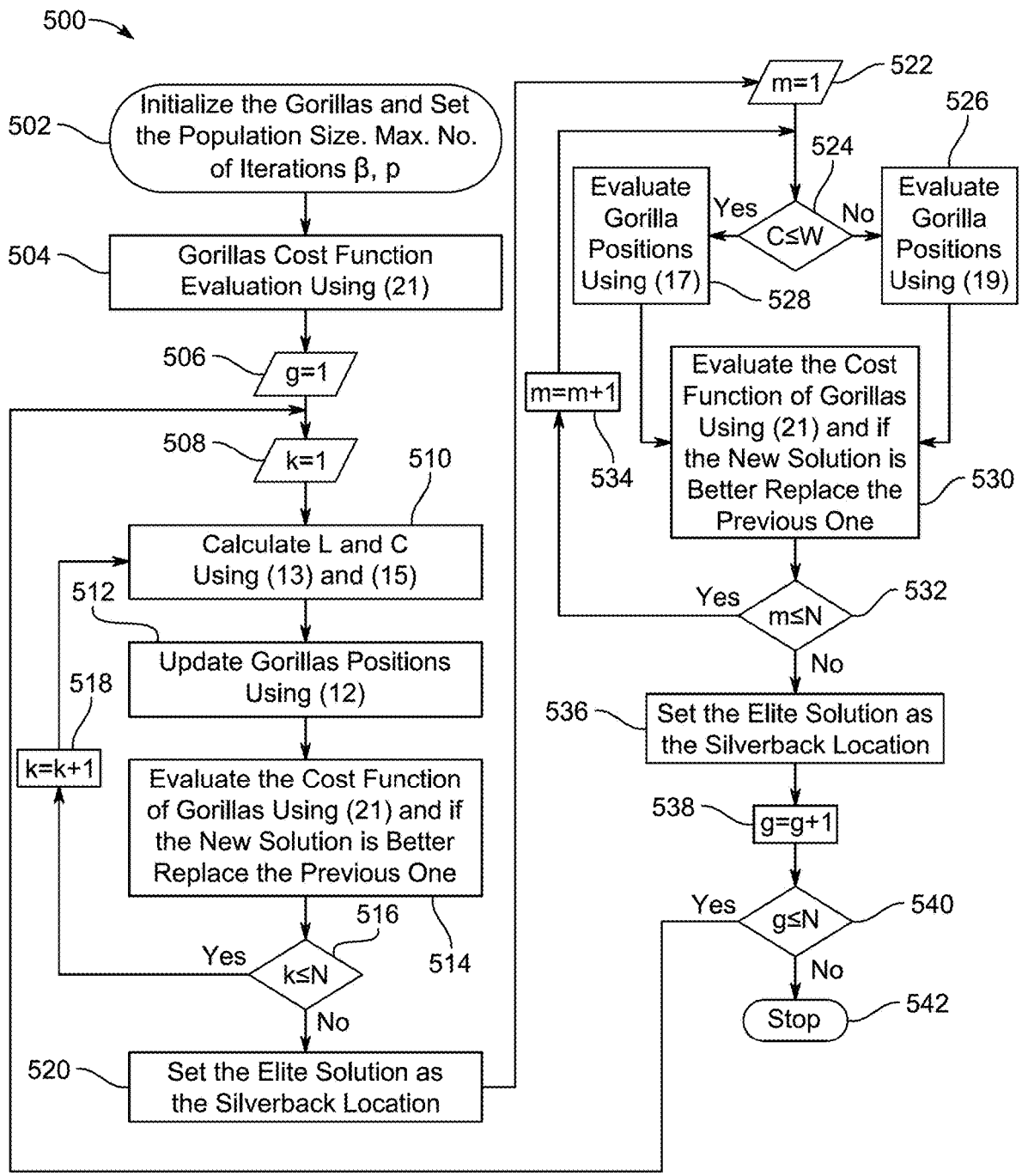
FIG. 5A illustrates a detailed flowchart of the GTO algorithm, according to some embodiments.

The GTO algorithm is based on natural social behavior of gorilla troops, which display complex social intelligence. The GTO models this intelligence through five key behavioural strategies, three of which are employed during the exploration phase of the algorithm that includes relocating to another gorilla, migrating to known locations, and migrating to unknown locations. These behaviours can be expressed mathematically using equations (12)-(16) and are applied during the exploration phase of the GTO to balance diversification and intensification of the search space.

$$GX(i+1) = \begin{cases} \min_b + (\max_b - \min_b) \times r_1 & r_2 < p \\ H \times L + X_{ran}(i)(r_3 - C) & r_2 \geq 0.5 \\ X(i) - L^2 \times (X(i) - GX(i)) + r_4 \times (X(i) - GX_{ran}(i)) & rand < 0.5 \end{cases} \quad (12)$$

$$C = (1 - i/i_{max}) \times F; \quad (13)$$

$$F = 1 + \cos(2r_5); \quad (14)$$

$$L = l \times C; \quad (15)$$

$$H = Z \times X(i), Z = [-C, C]; \quad (16)$$

where ($\min_b$, $\max_b$) are the variable limits, (GX(i+1), X(i)) are the position vectors of the gorilla at two successive iterations, and ($r_6$, $r_5$, $r_4$, $r_3$, $r_2$, $r_1$) are random positive numbers between [0, 1] produced with a uniform distribution. The parameter p, which falls within the range [0, 1], specifies the probability of choosing the migration option. When the exploration phase is completed, the solution GX(i) will take the place of X(i), and if GX(i)'s fitness function value is less than X(i), it will emerge as the silverback. Conversely, the exploitation phase of the GTO optimization process employs strategies like competing for adult females and trailing the silverback. These strategies can be expressed mathematically using Equation (17) through Equation (20). The flow chart that shows the GTO optimization execution steps is shown in FIG. 5A.

$$GX(i+1) = X(i) - M \times L \times (X(i) - X_{sb}) + r_4 \times (X(i) - GX_{ran}(i)); \quad (17)$$

$$M = \left(\left|1/GN \sum_{k=1}^{GN} GX_k(i)\right|^{2^L}\right)^{2^{-L}}; \quad (18)$$

$$GX(i) = X_{sb} - (Q \times X_{sb} - X(i) \times Q) \times A; \quad (19)$$

$$A = \beta \times E, Q = 2r_6 - 1, E = \begin{cases} N_1 & rand \geq 0.5 \\ N_2 & rand < 0.5 \end{cases}; \quad (20)$$

When the exploitation stage comes to its end, the cost of GX(i) is compared to that of its corresponding item, X(i). If GX(i) is less expensive than X(i), then GX(i) takes its place and emerges as the optimum choice (silverback).

FIG. 5A illustrates a detailed flowchart of the GTO algorithm. At step 502, the algorithm initiates by initializing gorillas and setting the gorilla population. Each gorilla represents a possible solution for the FOPI controller parameters: proportional gain ($K_p$), integral gain ($K_i$), and fractional order ($\lambda$). The total number of gorillas and the maximum number of iterations are defined as N. At step 504, the cost function for each gorilla in the population is evaluated using, for example an ISE, which measures the performance of the FOPI controller 202 in the microgrid simulation. The ISE is provided below:

$$\epsilon = \int_0^{T_s} (V_{dc} - V_{dc-ref})^2 dt; \quad (21)$$

At step 506, g is initialized to 1. At step 508, k is initialized to 1. At step 510, values of C and L are computed using Equation (13) and Equation (15). The values are used in balancing exploration and exploitation as the algorithm progresses. At step 512, gorilla positions are updated using exploration strategies and using Equation (12). At step 514, the cost function is re-evaluated using Equation (21) to check if the new position improves performance, and if the new position is better, the previous position is replaced with the new position. At step 516, it is determined if k is less than or equal to N. If k is lesser than or equal N, then k is increased by 1, at step 518 and the flow is looped back to step 512. If k is greater than N, then at step 520, the elite solution is set as the silverback location, and the the process moves to step 522. At step 522, parameter m is set to 1. At step 524, it is determined whether parameter C is less than or equal to a random variable W that can be initially selected in the optimization process. If C is greater than W, then at step 526, the gorilla positions are evaluated using Equation (19). Otherwise, at step 528, the gorilla positions are evaluated using Equation (17). At step 530, the cost function for each gorilla in the population is evaluated using Equation (21), and if a new solution is better, then the previous solution is replaced with the new solution. At step 532, it may be determined if m is less than or equal to N. If m is less than or equal to N, then at step 534, m is increased by one, and the flow is looped back to step 522. If m is greater than N, then at step 536, the identified low-cost solution is set as elite solution which is set as the silverback location, and the flow progresses to step 538. At step 538, g is increased by 1, and at step 540, it is determined if g is less than or equal to N. If g is less than or equal to N, then the flow is looped back to step 508. If g is greater than N, the flow stops at step 542.

Figure 5B:
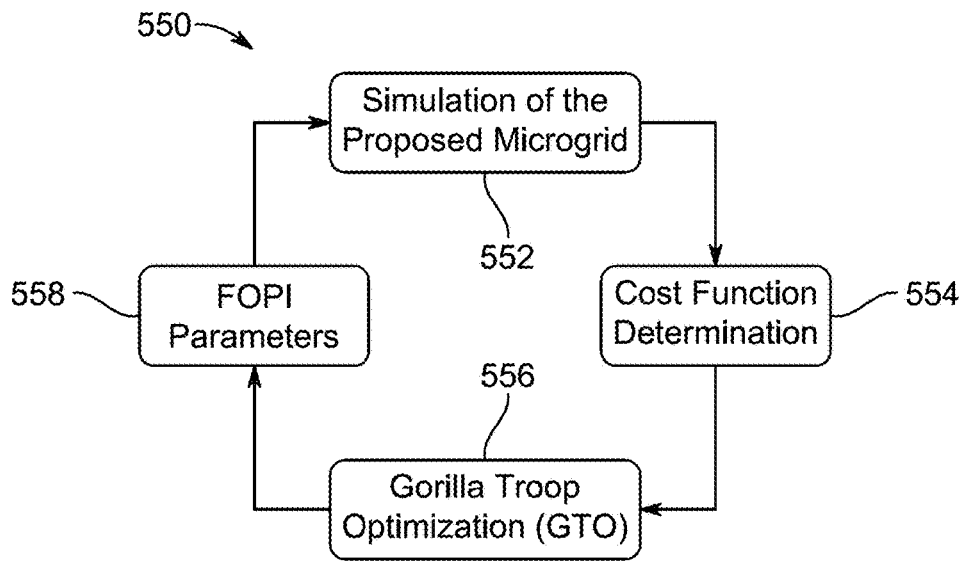
FIG. 5B is a flow diagram illustrating a procedure used to determine the optimal gains of the FOPI controller for an outer control loop of a semiactive HESS, according to some embodiments.

Referring now to FIG. 5B, a flowchart 550 illustrates a process used to determine the optimal gains of the FOPI controller 202 for the outer control loop of a semiactive HESS. This process is carried out using the GTO algorithm, which systematically refines controller parameters to minimize a defined objective function based on system performance.

At step 552, the simulation of the disclosed microgrid is initiated using the current set of FOPI parameters. These parameters are represented as a population of candidate solutions (gorillas), where each individual is characterized by three values corresponding to the FOPI gains: proportional gain (Kp), integral gain (Ki), and the fractional order (λ).

Subsequently, at step 554, the cost function is evaluated using the ISE metric, as expressed in Equation (21).

$$\epsilon = \int_0^{T_s} (V_{dc} - V_{dc-ref})^2 dt; \quad (21)$$

where $T_s$ is the simulation time. Equation (21) quantitatively assesses the effectiveness of the voltage regulation, with lower values indicating better controller performance.

At step 556, the GTO algorithm is employed to process the current cost function values and to generate new candidate solutions. These new solutions are derived by combining the most fit individuals from the previous generation and subjecting them to biologically inspired search strategies such as social migration, competitive behavior, and learning from the best individual (silverback gorilla). The quality of these new solutions is evaluated, and the population is updated accordingly. At step 558, the best-performing FOPI parameter set is selected based on the minimized objective function, and the process iterates until convergence criteria are satisfied.

The above steps of the GTO procedure to determine the desired parameters of the disclosed FOPI controller 202 can be summarized as the following steps.

1. Establish the gorilla population, which is thought to be a potential answer for the FOPI gains (i.e., three quantities).
2. Using the parameters produced by GTO, simulate the disclosed microgrid.
3. To measure the effectiveness of the control system, compute the cost function using the ISE.
4. Combine the best answers from the previous phase to create new ones. Determine whether the new solutions are fit.
5. Based on fitness, choose the population's finest solutions.
6. Continue the procedure until the required end points are met.

In an embodiment, the optimization procedure is executed using the following GTO parameters: β=3, w=0.8, and p=0.03. The applied GTO algorithm successfully minimizes the objective function value to approximately 0.012, achieving convergence in roughly 85 iterations. The final optimized FOPI parameters are determined to be $K_p$=20, $K_i$=50, and λ=0.05, which yielded superior control performance in regulating the DC-link voltage of the proposed microgrid.

Figure 5C:
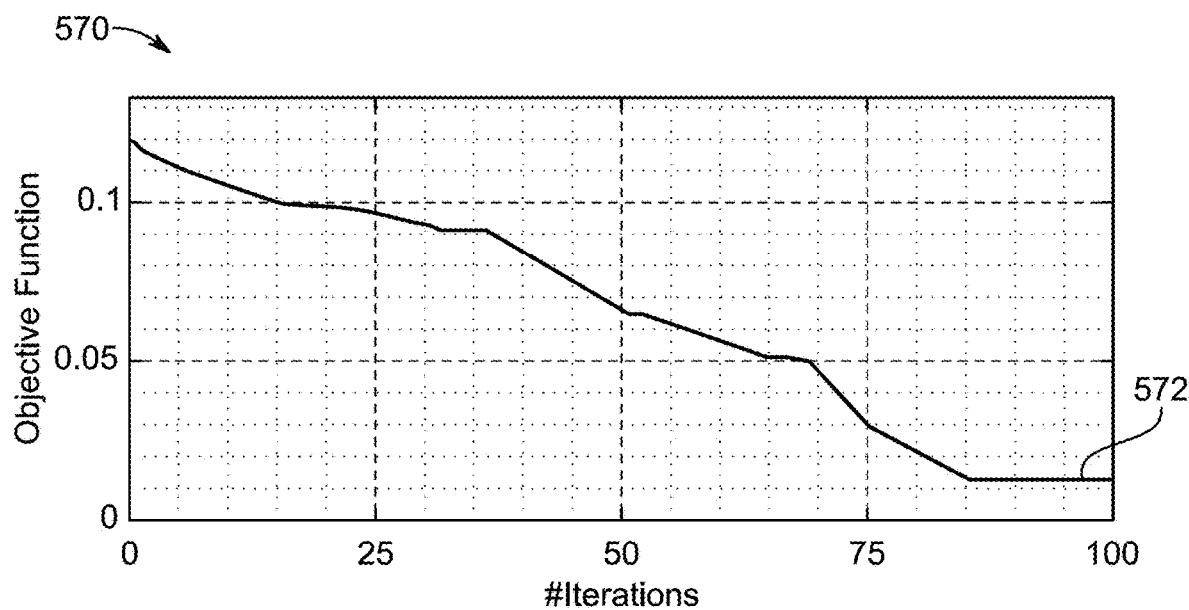
FIG. 5C illustrates a plot showing a convergence behavior of the GTO algorithm, according to some embodiments.

FIG. 5C illustrates a plot 570 of the convergence behavior of the GTO algorithm over 100 iterations, as indicated by the objective function value plotted against the number of iterations. The curve 572 shows a rapid decline in the objective function value during the early stages, with convergence achieved around the 85th iteration. The optimization process yields finely tuned FOPI controller parameters, specifically $K_p$=20, $K_i$=50, and λ=0.05. Notably, the GTO approach successfully minimizes the cost function, defined by the ISE, to an estimated value of approximately 0.012. The value highlights the algorithm's efficiency in approaching optimal gain values within a relatively short computational time frame.

Aspects of the disclosure provide a control system for controlling a direct current (DC) link voltage of a hybrid energy storage system (HESS). The control system includes a fractional-order proportional integral (FOPI) controller configured to receive a voltage difference between the DC link voltage and a predetermined reference voltage and generate a reference charging current based on the voltage difference, a hysteresis controller configured to receive a current difference between the reference charging current and a charging current of the HESS and generate a control signal based on the current difference, and a logic circuit configured to receive the control signal and manage charging and discharging procedures of the HESS based on the control signal, so that the DC link voltage of the HESS is maintained to be constant at the predetermined reference voltage, where the FOPI controller is configured with parameters set based on a metaheuristic technique.

In an embodiment, the logic circuit is configured to manage the charging and discharging procedures of the HESS by controlling a duty cycle of a bidirectional DC-DC converter of the HESS.

In an embodiment, the bidirectional DC-DC converter is connected between a DC link of the HESS corresponding to the DC link voltage and a storage battery of the HESS.

In an embodiment, the charging current of the HESS is a battery current of the storage battery of the HESS.

In an embodiment, an ultra-capacitor of the HESS is directly connected to the DC link of the HESS.

In an embodiment, the metaheuristic technique includes gorilla troop optimization (GTO).

In an embodiment, the configured parameters of the FOPI controller are set by generating multiple sets of preliminary parameters of the FOPI controller based on the GTO, obtaining multiple results from a cost function each corresponding to a respective set of preliminary parameters of the FOPI controller, and selecting one of the multiple sets of preliminary parameters as the configured parameters of the FOPI controller based on the multiple results of the cost function.

In an embodiment, the result corresponding to the configured parameters is lowest among the multiple results from the cost function.

In an embodiment, the obtaining the multiple results from the cost function includes for each set of preliminary parameters of the FOPI controller, generating a respective DC link voltage, and for each DC link voltage, calculating an integral square error of the respective DC link voltage relative to the predetermined reference voltage.

In an embodiment, generating the respective DC link voltage includes measuring the respective DC link voltage over a predetermined period of time, and the calculating the integral square error of the respective DC link voltage relative to the predetermined reference voltage includes calculating the integral square error of the respective DC link voltage relative to the predetermined reference voltage over the predetermined period of time.

Aspects of the disclosure provide a method of controlling a direct current (DC) link voltage of a hybrid energy storage system (HESS). The method includes receiving, by a fractional-order proportional integral (FOPI) controller, a voltage difference between the DC link voltage and a predetermined reference voltage, generating, by the FOPI controller, a reference charging current based on the voltage difference, receiving, by a hysteresis controller, a current difference between the reference charging current and a charging current of the HESS, generating, by the hysteresis controller, a control signal based on the current difference, receiving, by a logic circuit, the control signal, and managing, by the logic circuit, charging and discharging procedures of the HESS based on the control signal, so that the DC link voltage of the HESS is maintained to be constant at the predetermined reference voltage, where the FOPI controller is configured with parameters set based on a metaheuristic technique.

In an embodiment, the managing the charging and discharging procedures of the HESS includes controlling, by the logic circuit, a duty cycle of a bidirectional DC-DC converter of the HESS.

In an embodiment, the bidirectional DC-DC converter is connected between a DC link of the HESS corresponding to the DC link voltage and a storage battery of the HESS.

In an embodiment, the charging current of the HESS is a battery current of the storage battery of the HESS.

In an embodiment, an ultra-capacitor of the HESS is directly connected to the DC link of the HESS.

In an embodiment, the metaheuristic technique includes gorilla troop optimization (GTO).

In an embodiment, the configured parameters of the FOPI controller are set by generating multiple sets of preliminary parameters of the FOPI controller based on the GTO, obtaining multiple results from a cost function each corresponding to a respective set of preliminary parameters of the FOPI controller, and selecting one of the multiple sets of preliminary parameters as the configured parameters of the FOPI controller based on the multiple results of the cost function.

In an embodiment, the result corresponding to the configured parameters is lowest among the multiple results from the cost function.

In an embodiment, the obtaining the multiple results from the cost function includes: for each set of preliminary parameters of the FOPI controller, generating a respective DC link voltage, and for each DC link voltage, calculating an integral square error of the respective DC link voltage relative to the predetermined reference voltage.

In an embodiment, the generating the respective DC link voltage includes measuring the respective DC link voltage over a predetermined period of time, and the calculating the integral square error of the respective DC link voltage relative to the predetermined reference voltage includes calculating the integral square error of the respective DC link voltage relative to the predetermined reference voltage over the predetermined period of time.

Figure 6:
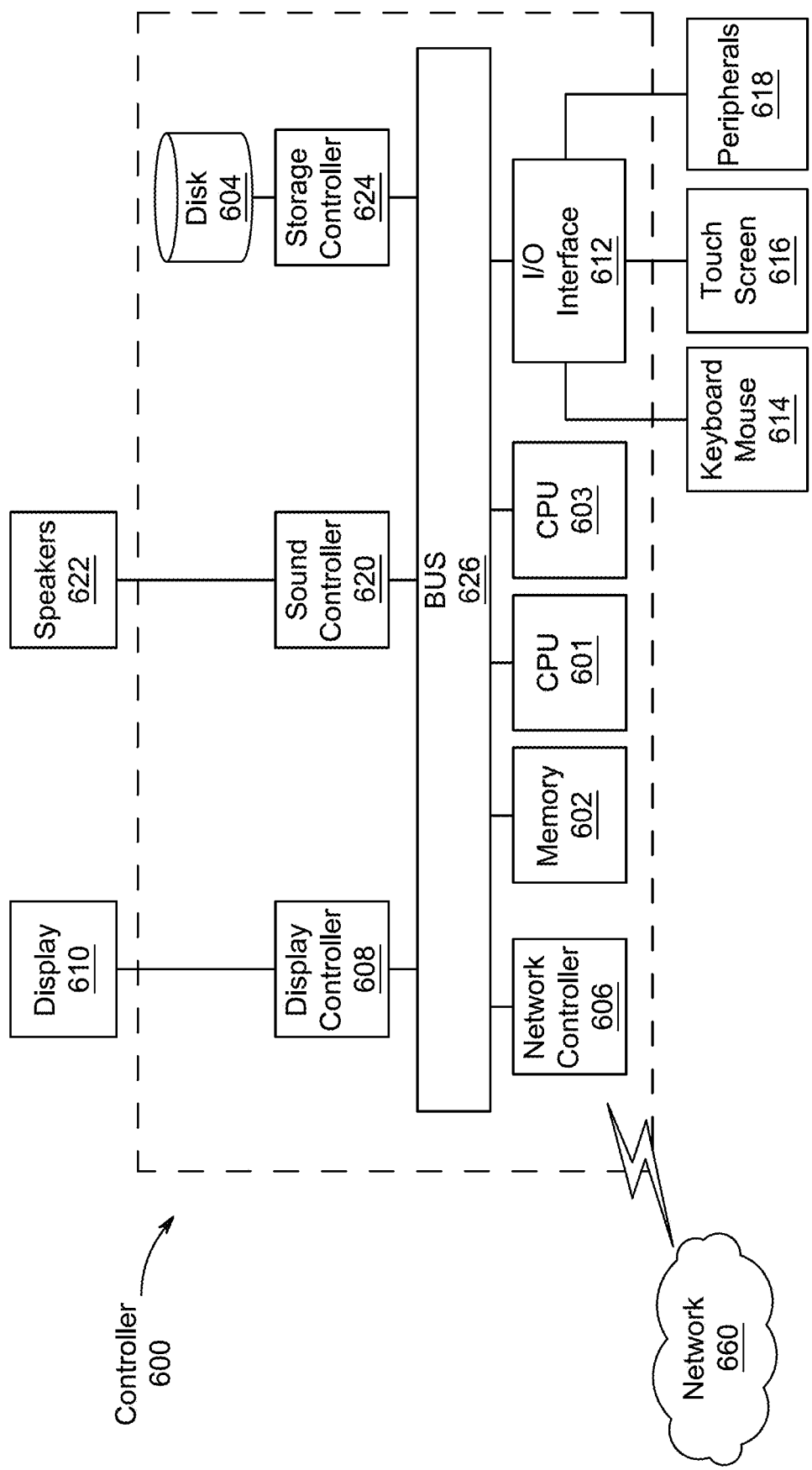
FIG. 6 is an illustration of a non-limiting example of details of computing hardware used in a computing system, according to some embodiments.

Next, further details of the hardware description of the computing environment according to exemplary embodiments are described with reference to FIG. 6. In FIG. 6, a controller 600 that is described as representative of the HESS controller 250 of FIG. 2A in which the FOPI controller 202 includes a CPU 602 which performs the processes described above/below. The process data and instructions may be stored in memory 604. These processes and instructions may also be stored on a storage medium disk 608 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 602, 606 and an operating system such as Microsoft Windows 7, Microsoft Windows 8, Microsoft Windows 9, UNIX, Solaris, LINUX, Apple MAC-OS and other systems known to those skilled in the art.

The hardware elements in order to achieve the computing device may be realized by various circuitry elements, known to those skilled in the art. For example, CPU 602 or CPU 606 may be a Xenon or Core processor from Intel of America or an Opteron processor from AMD of America, or may be other processor types that would be recognized by one of ordinary skill in the art. Alternatively, the CPU 602, 606 may be implemented on an FPGA, ASIC, PLD or using discrete logic circuits, as one of ordinary skill in the art would recognize. Further, CPU 602, 606 may be implemented as multiple processors cooperatively working in parallel to perform the instructions of the inventive processes described above.

The computing device in FIG. 6 also includes a network controller 610, such as an Intel Ethernet PRO network interface card from Intel Corporation of America, for interfacing with network 632. As can be appreciated, the network 632 can be a public network, such as the Internet, or a private network, such as an LAN or WAN network, or any combination thereof and can also include PSTN or ISDN subnetworks. The network 632 can also be wired, such as an Ethernet network, or can be wireless, such as a cellular network including EDGE, 3G, 4G and 5G wireless cellular systems. The wireless network can also be WiFi, Bluetooth, or any other wireless form of communication that is known.

The computing device further includes a display controller 612, such as a NVIDIA Geforce GTX or Quadro graphics adaptor from NVIDIA Corporation of America for interfacing with display 614, such as a Hewlett Packard HPL2445w LCD monitor. A general purpose I/O interface 616 interfaces with a keyboard and/or mouse 618 as well as a touch screen panel 620 on or separate from display 614. General purpose I/O interface also connects to a variety of peripherals 622 including printers and scanners, such as an OfficeJet or DeskJet from Hewlett Packard.

A sound controller 624 is also provided in the computing device such as Sound Blaster X-Fi Titanium from Creative, to interface with speakers/microphone 626 thereby providing sounds and/or music.

The general-purpose storage controller 628 connects the storage medium disk 608 with communication bus 630, which may be an ISA, EISA, VESA, PCI, or similar, for interconnecting all of the components of the computing device. A description of the general features and functionality of the display 614, keyboard and/or mouse 618, as well as the display controller 612, storage controller 628, network controller 610, sound controller 624, and general purpose I/O interface 616 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 7.

Figure 7:
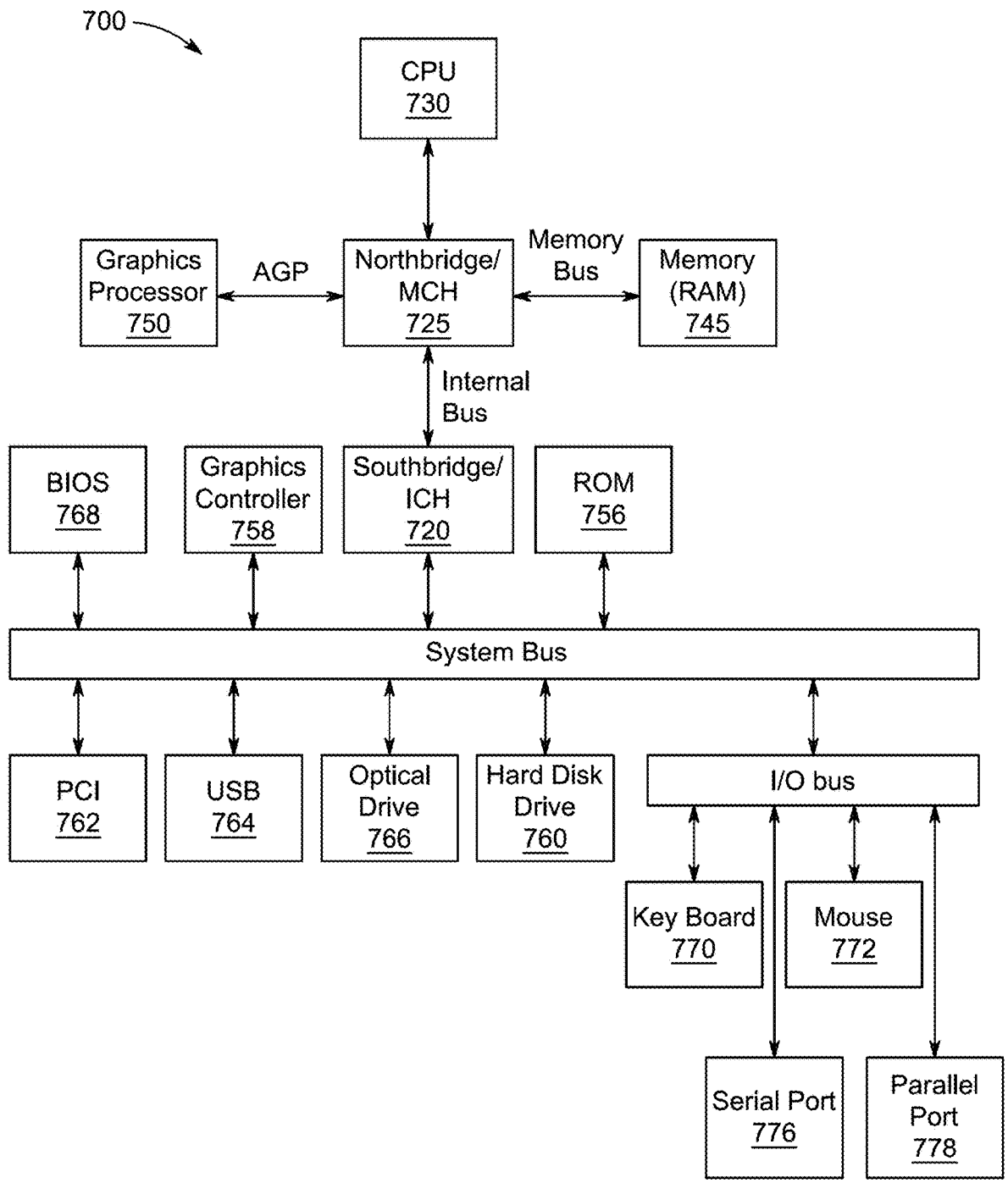
FIG. 7 is an exemplary schematic diagram of a data processing system used within the computing system, according to some embodiments.

FIG. 7 shows a schematic diagram of a data processing system 700, according to certain embodiments, for performing the functions of the exemplary embodiments. The data processing system 700 is an example of a computer in which code or instructions implementing the processes of the illustrative embodiments may be located.

In FIG. 7, the data processing system 700 employs a hub architecture including a north bridge and memory controller hub (NB/MCH) 702 and a south bridge and input/output (I/O) controller hub (SB/ICH) 704. The central processing unit (CPU) 706 is connected to NB/MCH 702. The NB/MCH 702 also connects to the memory 708 via a memory bus and connects to the graphics processor 710 via an accelerated graphics port (AGP). The NB/MCH 702 also connects to the SB/ICH 704 via an internal bus (e.g., a unified media interface or a direct media interface). The CPU Processing unit 706 may contain one or more processors and even may be implemented using one or more heterogeneous processor systems.

Figure 8:
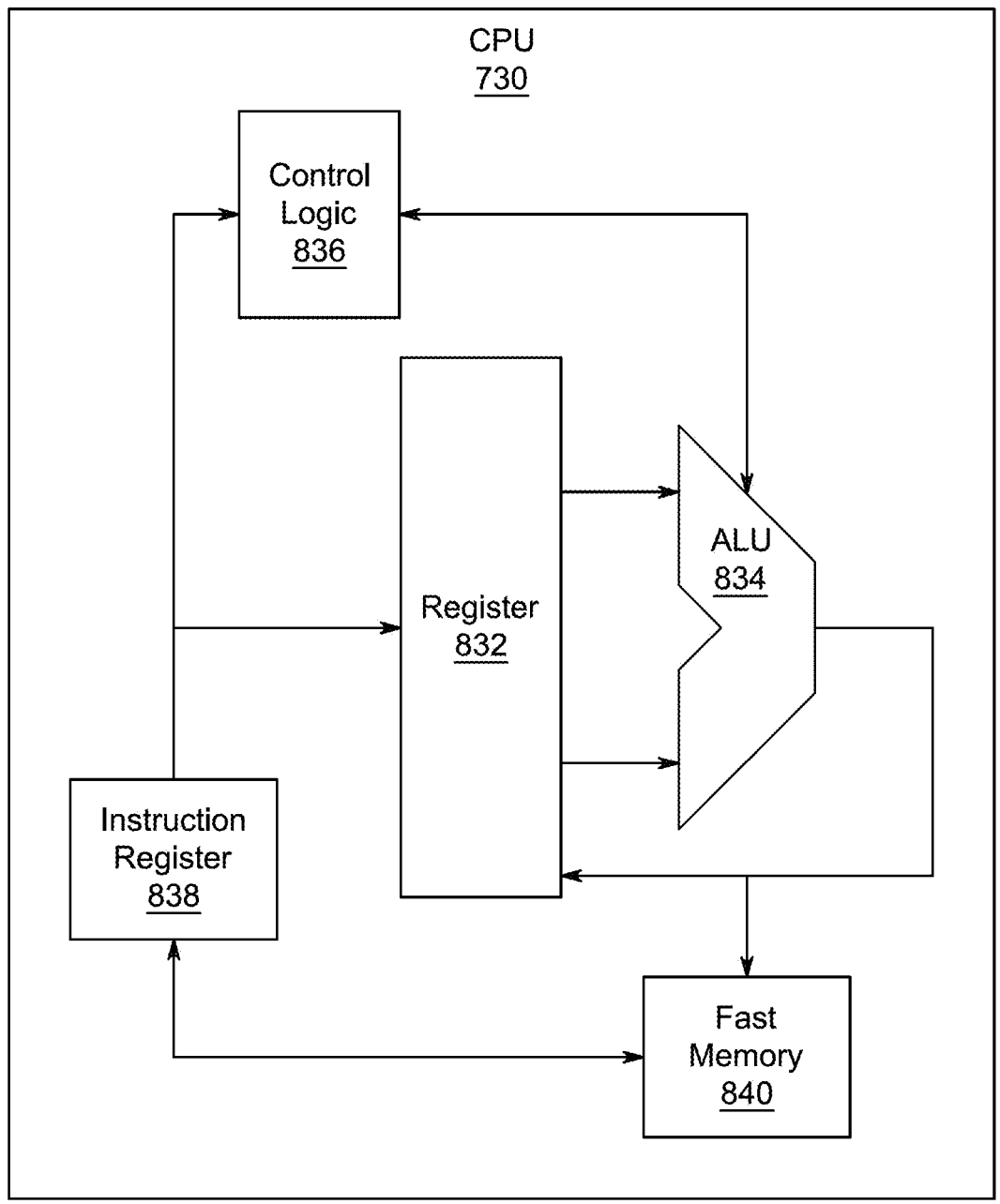
FIG. 8 is an exemplary schematic diagram of a processor used with the computing system, according to some embodiments.

For example, FIG. 8 shows one implementation of CPU 706. In one implementation, the instruction register 808 retrieves instructions from the fast memory 810. At least part of these instructions is fetched from the instruction register 808 by the control logic 806 and interpreted according to the instruction set architecture of the CPU 706. Part of the instructions can also be directed at the register 802. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 804 that loads values from the register 802 and performs logical and mathematical operations on the loaded values according to the instructions. The results from these operations can be feedback into the register and/or stored in the fast memory 810. According to certain implementations, the instruction set architecture of the CPU 706 can use a reduced instruction set architecture, a complex instruction set architecture, a vector processor architecture, and a very large instruction word architecture. Furthermore, the CPU 706 can be based on the Von Neuman model or the Harvard model. The CPU 706 can be a digital signal processor, an FPGA, an ASIC, a PLA, a PLD, or a CPLD. Further, the CPU 706 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 704 is coupled through a system bus to an I/O Bus, a read only memory (ROM) 712, universal serial bus (USB) port 714, a flash binary input/output system (BIOS) 716, and a graphics controller 718. PCI/PCIe devices can also be coupled to SB/ICH 704 through a PCI bus 720.

The PCI devices may include, for example, Ethernet adapters, add-in cards, and PC cards for notebook computers. The Hard disk drive 722 and optical drive 724 can use, for example, an integrated drive electronics (IDE) or serial advanced technology attachment (SATA) interface. In one implementation the I/O bus can include a super I/O (SIO) device.

Further, the hard disk drive (HDD) 722 and optical drive 724 can also be coupled to the SB/ICH 704 through a system bus. In one implementation, a keyboard 726, a mouse 728, a parallel port 730, and a serial port 732 can be connected to the system bus through the I/O bus. Other peripherals and devices that can be connected to the SB/ICH 704 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 9:
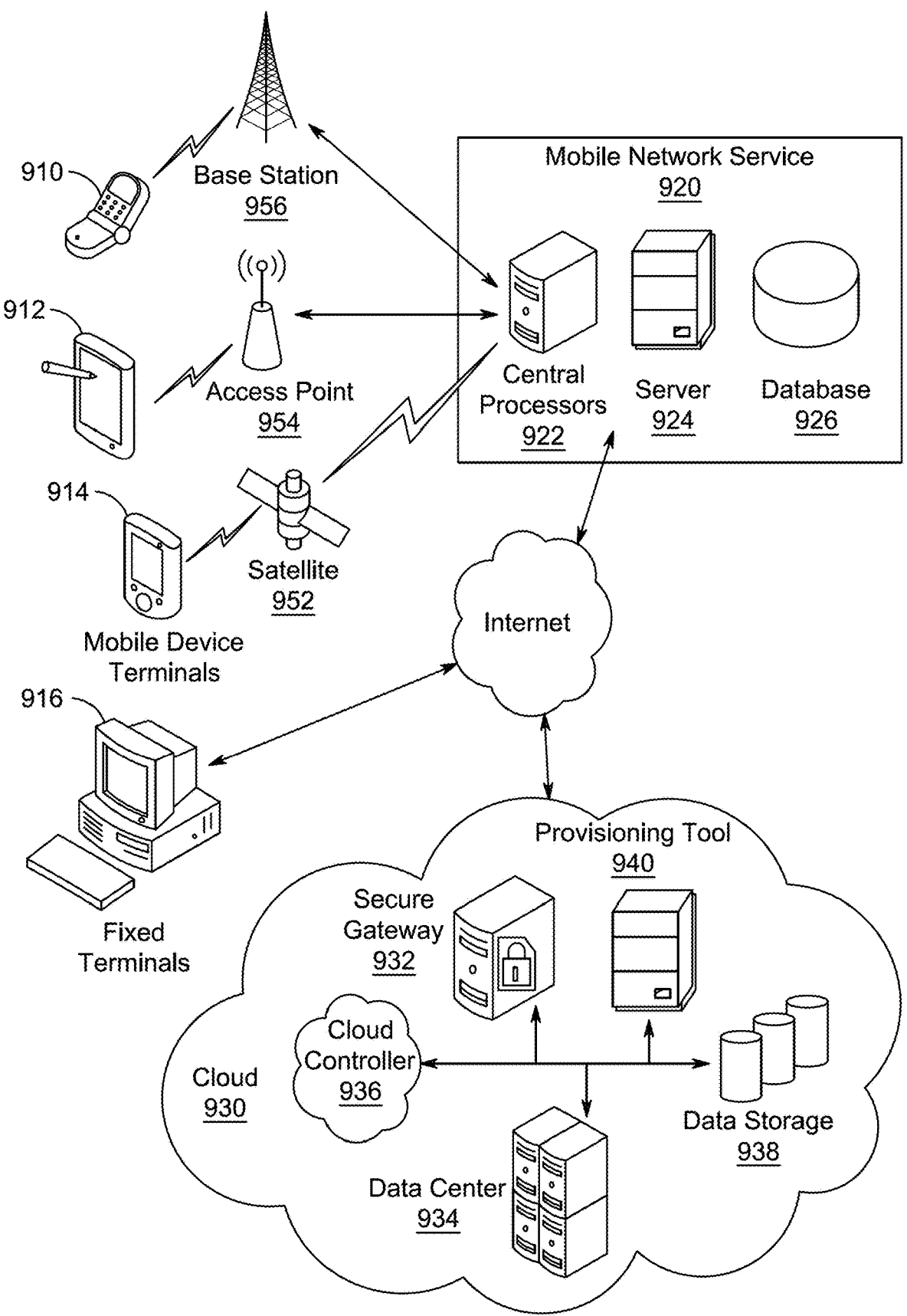
FIG. 9 is an illustration of a non-limiting example of distributed components which may share processing with a controller, according to some embodiments.

The functions and features described herein may also be executed by various distributed components of a system. For example, one or more processors may execute these system functions, wherein the processors are distributed across multiple components communicating in a network. The distributed components may include one or more client and server machines, such as cloud 902 including a cloud controller 904, a secure gateway 906, a data center 908, data storage 910 and a provisioning tool 912, and mobile network services 914 including central processors 916, a server 918 and a database 920, which may share processing, as shown by FIG. 9, in addition to various human interface and communication devices (e.g., display monitors 922, smart phones 928, tablets 926, personal digital assistants (PDAs) 924). The network may be a private network, such as a LAN, satellite 932 or WAN 934, or be a public network 930, may such as the Internet 936. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A control system for controlling a direct current (DC) link voltage of a hybrid energy storage system (HESS), the control system comprising:
    a fractional-order proportional integral (FOPI) controller configured to receive a voltage difference between the DC link voltage and a predetermined reference voltage and generate a reference charging current based on the voltage difference;
    a hysteresis controller configured to receive a current difference between the reference charging current and a charging current of the HESS and generate a control signal based on the current difference; and
    a logic circuit configured to receive the control signal and manage charging and discharging procedures of the HESS based on the control signal, so that the DC link voltage of the HESS is maintained to be constant at the predetermined reference voltage,
    wherein the FOPI controller is configured with parameters set based on a metaheuristic technique.

2. The control system of claim 1, wherein the logic circuit is configured to manage the charging and discharging procedures of the HESS by controlling a duty cycle of a bidirectional DC-DC converter of the HESS.

3. The control system of claim 2, wherein the bidirectional DC-DC converter is connected between a DC link of the HESS corresponding to the DC link voltage and a storage battery of the HESS.

4. The control system of claim 3, wherein the charging current of the HESS is a battery current of the storage battery of the HESS.

5. The control system of claim 3, wherein an ultra-capacitor of the HESS is directly connected to the DC link of the HESS.

6. The control system of claim 1, wherein the metaheuristic technique includes gorilla troop optimization (GTO).

7. The control system of claim 6, wherein the configured parameters of the FOPI controller are set by generating multiple sets of preliminary parameters of the FOPI controller based on the GTO, obtaining multiple results from a cost function each corresponding to a respective set of preliminary parameters of the FOPI controller, and selecting one of the multiple sets of preliminary parameters as the configured parameters of the FOPI controller based on the multiple results of the cost function.

8. The control system of claim 7, wherein the result corresponding to the configured parameters is lowest among the multiple results from the cost function.

9. The control system of claim 7, wherein the obtaining the multiple results from the cost function includes:
    for each set of preliminary parameters of the FOPI controller, generating a respective DC link voltage; and
    for each DC link voltage, calculating an integral square error of the respective DC link voltage relative to the predetermined reference voltage.

10. The control system of claim 9, wherein the generating the respective DC link voltage includes measuring the respective DC link voltage over a predetermined period of time, and the calculating the integral square error of the respective DC link voltage relative to the predetermined reference voltage includes calculating the integral square error of the respective DC link voltage relative to the predetermined reference voltage over the predetermined period of time.

11. A method of controlling a direct current (DC) link voltage of a hybrid energy storage system (HESS), the method comprising:
    receiving, by a fractional-order proportional integral (FOPI) controller, a voltage difference between the DC link voltage and a predetermined reference voltage;
    generating, by the FOPI controller, a reference charging current based on the voltage difference;
    receiving, by a hysteresis controller, a current difference between the reference charging current and a charging current of the HESS;
    generating, by the hysteresis controller, a control signal based on the current difference;
    receiving, by a logic circuit, the control signal; and
    managing, by the logic circuit, charging and discharging procedures of the HESS based on the control signal, so that the DC link voltage of the HESS is maintained to be constant at the predetermined reference voltage,
    wherein the FOPI controller is configured with parameters set based on a metaheuristic technique.

12. The method of claim 11, wherein the managing the charging and discharging procedures of the HESS includes controlling, by the logic circuit, a duty cycle of a bidirectional DC-DC converter of the HESS.

13. The method of claim 12, wherein the bidirectional DC-DC converter is connected between a DC link of the HESS corresponding to the DC link voltage and a storage battery of the HESS.

14. The method of claim 13, wherein the charging current of the HESS is a battery current of the storage battery of the HESS.

15. The method of claim 13, wherein an ultra-capacitor of the HESS is directly connected to the DC link of the HESS.

16. The method of claim 11, wherein the metaheuristic technique includes gorilla troop optimization (GTO).

17. The method of claim 16, wherein the configured parameters of the FOPI controller are set by generating multiple sets of preliminary parameters of the FOPI controller based on the GTO, obtaining multiple results from a cost function each corresponding to a respective set of preliminary parameters of the FOPI controller, and selecting one of the multiple sets of preliminary parameters as the configured parameters of the FOPI controller based on the multiple results of the cost function.

18. The method of claim 17, wherein the result corresponding to the configured parameters is lowest among the multiple results from the cost function.

19. The method of claim 17, wherein the obtaining the multiple results from the cost function includes:
    for each set of preliminary parameters of the FOPI controller, generating a respective DC link voltage; and
    for each DC link voltage, calculating an integral square error of the respective DC link voltage relative to the predetermined reference voltage.

20. The method of claim 19, wherein the generating the respective DC link voltage includes measuring the respective DC link voltage over a predetermined period of time, and the calculating the integral square error of the respective DC link voltage relative to the predetermined reference voltage includes calculating the integral square error of the respective DC link voltage relative to the predetermined reference voltage over the predetermined period of time.

* * * * *